United States Patent [19]
Togai et al.

[11] Patent Number: 5,382,205
[45] Date of Patent: Jan. 17, 1995

[54] CONTROL DEVICE FOR AN INTERNAL COMBUSTION ENGINE AND A CONTINUOUS VARIABLE TRANSMISSION

[75] Inventors: Kazuhide Togai, Takatsuki; Takashi Takatsuka, Kyoto; Makoto Shimada, Okazaki; Junji Kawai, Anjo; Kazuya Hayafune, Okazaki, all of Japan

[73] Assignee: Mitsubishi Jidosha Kogyo Kabushiki Kaisha, Tokyo, Japan

[21] Appl. No.: 949,882
[22] PCT Filed: Mar. 30, 1991
[86] PCT No.: PCT/JP92/00391
§ 371 Date: Jan. 7, 1993
§ 102(e) Date: Jan. 7, 1993
[87] PCT Pub. No.: WO92/17348
PCT Pub. Date: Oct. 15, 1992

[30] Foreign Application Priority Data

Mar. 29, 1991 [JP] Japan .................. 3-066820
Mar. 29, 1991 [JP] Japan .................. 3-066821
Apr. 2, 1991 [JP] Japan .................. 3-070132
Apr. 19, 1991 [JP] Japan .................. 3-088602

[51] Int. Cl.$^6$ ................ F16H 59/14; F16H 67/02
[52] U.S. Cl. ................ 477/43; 427/102; 427/107; 427/48
[58] Field of Search .......................... 74/859

[56] References Cited

U.S. PATENT DOCUMENTS

| | | | |
|---|---|---|---|
| 4,467,761 | 8/1984 | Hasegawa | 123/339 |
| 4,507,986 | 4/1985 | Okamura et al. | 74/866 |
| 4,515,040 | 5/1985 | Takeuchi et al. | 74/866 |
| 4,580,465 | 4/1986 | Omitsu | 74/866 |
| 4,593,581 | 6/1986 | Omitsu | 74/866 |
| 4,612,827 | 9/1986 | Omitsu | 74/866 |
| 4,720,793 | 1/1988 | Watanabe et al. | 364/424.1 |
| 4,750,598 | 6/1988 | Danno et al. | 192/0.058 |
| 4,774,858 | 10/1988 | Ganoung | 74/859 |
| 4,989,149 | 1/1991 | Mimura et al. | 364/426.04 |

Primary Examiner—Dirk Wright

[57] ABSTRACT

A control device for an internal combustion engine (E) and a continuous variable transmission (35) according to the present invention is disposed in a power transmission method (P) between the internal combustion engine (E) mounted on a vehicle and driving wheels (32) and of which transmission ratio can be continuously changed at a predetermined transmission speed Vm so as to maintain the transmission ratio i suitable for engine speed $\omega e$ and vehicle speed Vc. In addition, the device controls power of the internal combustion engine (E).

The control device for an internal combustion engine (E) and a continuous variable transmission (35) sets the transmission speed Vm according to a deviation $\Delta i$ between an objective transmission ratio io and an actual transmission ratio in to control the continuous variable transmission (35) at the transmission speed Vm. On the other hand, it controls the power of the internal combustion engine (E) by means of transmission auxiliary torque $\Delta Te$ with respect to the transmission speed Vm, so that it is possible to change the continuous variable transmission 35 at suitable transmission speed Vm. This results in reduction of the slip and shock caused on transmission operation of the continuous variable transmission (35).

69 Claims, 31 Drawing Sheets

FIG. 24
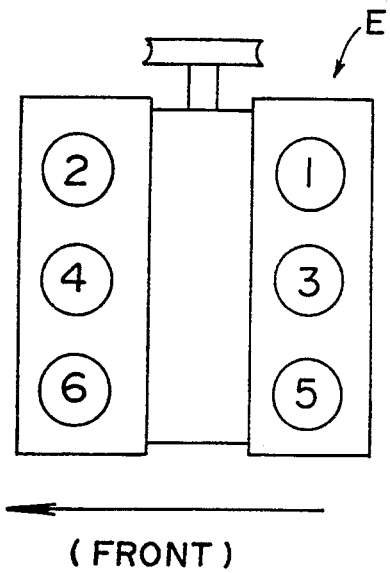
(FRONT)
FIG. 25(a)
QUANTITY OF CYLINDERS TO BE DISCONNECTED
| VALUE OF Nfc | |
|---|---|
| 0 ≦ Nfc < 2 | 0 |
| 2 ≦ Nfc < 3 | 2 |
| 3 ≦ Nfc < 4 | 3 |
| 4 ≦ Nfc | 4 |
FIG. 25(b)
QUANTITY OF CYLINDERS WHOSE FUEL SUPPLY IS STOPPED
| | CYLINDER NO. |
|---|---|
| 6 | 1 ~ 6 |
| 4 | 1, 3, 4, 6 |
| 3 | 2, 4, 6 |
| 2 | 2, 5 |
FIG. 26
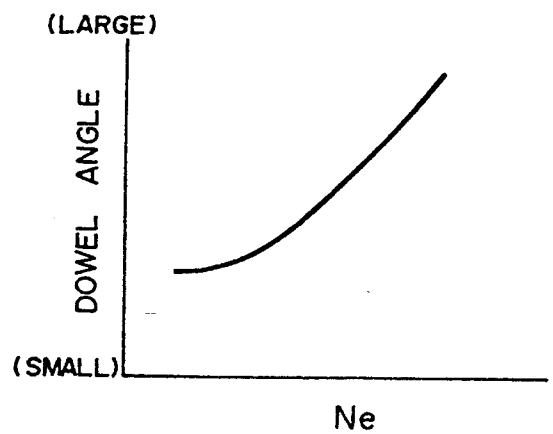

FIG. 35

CONTROL DEVICE FOR AN INTERNAL COMBUSTION ENGINE AND A CONTINUOUS VARIABLE TRANSMISSION

BACKGROUND OF THE INVENTION

1. Technical Field

This invention relates to a control device for an internal combustion engine and a continuously variable transmission. The control device is connected to the continuously variable transmission, which is disposed between the internal combustion engine mounted on a vehicle and driving wheels, and changes and controls a transmission ratio of the continuously variable transmission at a transmission ratio changing speed suitable for driving conditions of the vehicle while controlling an output of the internal combustion engine.

2. Description of Related Art

Generally, engine output (hereinafter, referred merely as output) of an internal combustion engine (hereinafter, referred merely as an engine) mounted on a vehicle is mechanically controlled by a throttle device coupled to a driver-operable member such as an accelerator pedal and a throttle lever (which are representatively referred to as accelerator pedal hereinafter) through an accelerator cable.

The accelerator pedal and a throttle device cooperate with each other such that the displacement corresponding to a stepping amount of the accelerator pedal is transmitted to the throttle device, and a throttle valve in the device is actuated according to the displacement (stepping amount). Unfortunately, excessive output may be generated due to careless driving and lack of skill of a driver. Consequently, a vehicle may slide on starting, slip on icy ground, and skid (slip) upon sudden acceleration.

Accordingly, methods have been proposed such as a dual throttle valve method where a main throttle valve and a sub throttle valve are arranged in the throttle device. The sub throttle valve is electronically controlled via a traction control (power control) method utilizing the so called drive-by-wire method. In this method, the accelerator cable is not disposed between the accelerator pedal and the throttle valve, and an opening of the accelerator pedal is detected using a sensor such as a potentiometer. The throttle valve is then operated by a stepping motor or the like based on output of the sensor.

In the traction control method of the type described, an ECU (engine control unit) generally calculates an optimum opening (i.e., target engine output) for the sub throttle valve and the main throttle valve in accordance with the (1) data representative of the rotation condition of the front and rear wheels and (2) a step amount for the accelerator pedal. The ECU controls a driving torque of the wheels in a range which does not cause undesirable skid.

Information regarding the required output of the engine is properly set in accordance with, for example, the opening of the accelerator pedal. As mentioned above, the ECU calculates and sets the required output of the engine when using the traction control method for controlling the sub throttle valve and the main throttle valve so as to obtain the required output. In this event, it is preferable to carry out the calculation of the required output with respect to an actual torque under current engine conditions. More specifically, by calculating a deviation between a required torque and the actual torque and by carrying out a real-time control to eliminate the deviation, it is possible to prevent overcontrol and poor response of the control device.

While, the actual torque of the engine can be detected under a bench test using a chassis dynamometer, it is difficult in practice to mount the dynamometer on a vehicle due to the weight, size, and costs of the device. Plus, there is a serious defect that output (energy) loss is inevitably caused.

Accordingly, it is assumed that precision of the output control can be improved by calculating the actual torque in accordance with intake air flow information by using a conventional control system.

One power transmission method for transmitting output torque of the engine to wheels is a variable transmission. As one such transmission, a continuously variable transmission (CVT) can continuously change the transmission ratio by using a steel belt and pulleys, and can increase or decrease the transmission ratio changing speed depending on a hydraulic value supplied to a hydraulic actuator.

In the continuously variable transmission of the type described, the transmission ratio changing speed is calculated so as to eliminate a transmission ratio deviation between an objective transmission ratio, which is calculated in accordance with the driving conditions, and an actual transmission ratio. The hydraulic actuator of the continuously variable transmission is controlled in order to obtain the transmission ratio changing speed.

Problems to be solved by the present invention are as follows.

The conventional continuously variable transmission CVT mounted on a vehicle controls the hydraulic actuator so as to correct the actual transmission ratio to the object transmission ratio. However, a level of the torque to be transmitted is not taken into consideration.

Accordingly, when the transmission ratio of the CVT increases or decreases at a relatively low speed, the torque on the driving shaft is changed smoothly. On the other hand, when the transmission ratio deviation between the target transmission ratio and the actual transmission speed is relatively large, a transmission ratio changing has to be raised extensively. However, the continuously variable transmission CVT may cause a reduction in vehicle acceleration at extremely fast transmission ratio changing speeds on kick-down. Such a phenomenon is remarkable when the engine torque is small.

The continuous variable transmission CVT has a relatively large moment of inertia due to the pulleys. This negatively affects the transmission ratio changing speed with undesired excessive shock on transmission. In addition, excessive torque of the engine may result in sliding of a steel belt. Thus, the transmission ratio changing speed, which would lead to poor performance of the continuously variable transmission CVT, is restricted.

SUMMARY OF THE INVENTION

An object of the present invention is to provide a control device for an internal combustion engine which enables an increase in transmission ratio changing speed without enhancing shock caused on transmission.

A control device for an internal combustion engine and a continuously variable transmission, according to a first aspect of the present invention, wherein the control device, the engine and the continuously variable transmission are mounted on a vehicle, the continuously variable transmission (CVT) being disposed to transmit power between the internal combustion engine and driving wheels, and a transmission ratio of the CVT can be continuously changed, the control device comprising driving condition detecting means for detecting driving condition of the vehicle; objective transmission ratio setting means for setting an objective transmission ratio for the continuously variable transmission according to the driving condition detected by the driving condition detecting means; transmission ratio detecting means for detecting an actual transmission ratio of the continuously variable transmission; transmission ratio deviation calculating means for calculating a deviation between the objective transmission ratio set by the objective transmission ratio setting means and the actual transmission ratio detected by said transmission ratio detecting means; transmission ratio changing speed setting means for setting a transmission ratio changing speed which is a changing rate of the transmission ratio according to the transmission ratio deviation calculated by the transmission ratio deviation calculating means; transmission controlling means for controlling the continuously variable transmission such that the transmission speed set by the transmission ratio changing speed setting means can be obtained; transmission auxiliary torque calculating means for calculating transmission auxiliary torque which is consumed for a transmission operation of the continuously variable transmission according to the transmission ratio changing speed set by the transmission ratio changing speed setting means; and internal combustion engine controlling means for controlling power of the internal combustion engine according to the transmission auxiliary torque calculated by the transmission auxiliary torque calculating means.

Thus, the continuously variable transmission is controlled at the transmission ratio changing speed which is the changing rate of the transmission ratio. In addition, the output of the internal combustion engine is controlled with the transmission auxiliary torque corresponding to the transmission ratio changing speed. Accordingly, the continuously variable transmission can be operated to accomplish a suitable transmission ratio changing speed, and the internal combustion engine can be controlled with an adequate output. This results in reduction of shock caused during a transmission operation.

In a control device for an internal combustion engine and a continuous variable transmission, according to a second aspect of the present invention, the internal combustion engine comprises, in its intake system, intake air flow adjusting means which is independently controllable of the operation of a drive-operable member. The driving condition detecting means comprises acceleration requirement detecting means for detecting an operational amount of the driver-operable member as acceleration requirement information of the driver. The objective transmission ratio setting means sets the objective transmission ratio according to the operational amount of the driver-operable member detected by the acceleration requirement detecting means. The internal combustion engine controlling means comprises required torque setting means for setting a required torque, as torque which is necessary for acceleration required by the driver, according to the operational amount of the driver-operable member detected by the acceleration requirement detecting means. The objective engine torque setting means sets objective engine torque according to the required torque set by the target torque setting means and the transmission auxiliary torque calculated by the transmission auxiliary torque calculating means. The engine torque controlling means controls the intake air flow adjusting means so as to obtain the objective engine torque set by the objective engine torque setting means.

Thus, acceleration requirement information is obtained in accordance with the operational amount of the driver-operable member. Further, the required torque is calculated according to the acceleration requirement. The objective engine torque is calculated according to the required torque and the transmission auxiliary torque. The intake air flow adjusting means is controlled so as to obtain the objective engine torque, so that the internal combustion engine can be controlled with adequate output corresponding to the amount which is consumed on transmission by the continuously variable transmission at a transmission ratio changing speed to meet the acceleration requirement of the driver. The above results in reduction of shock caused during a transmission operation.

In a control device for an internal combustion engine and a continuously variable transmission, according to a third aspect of the present invention, the internal combustion engine comprises, in its intake system, intake air flow adjusting means which is independently controllable of the operation of a driver-operable member. The internal combustion engine controlling means comprises auxiliary intake air flow setting means for calculating auxiliary intake air flow which is necessary for obtaining the transmission auxiliary torque according to the transmission auxiliary torque calculated by said transmission auxiliary torque calculating means, and auxiliary intake air flow controlling means for controlling the intake air flow adjusting means so as to obtain the auxiliary intake air flow set by the transmission auxiliary torque setting means.

Thus, the auxiliary intake air flow which is necessary for obtaining the transmission auxiliary torque is calculated. The auxiliary intake air flow controlling means controls the intake air flow adjusting means so as to obtain the auxiliary intake air flow set by the auxiliary intake air flow setting means. Accordingly, adequate output corresponding to the amount which is consumed on transmission by the continuously variable transmission at a transmission ratio changing speed and the amount corresponding to the acceleration requirement of the driver can be obtained by adjusting the auxiliary intake air flow. This results in reduction of shock caused during a transmission operation due to under-power as the continuously variable transmission changes the transmission ratio.

In a control device for an internal combustion engine and a continuously variable transmission, according to a fourth aspect of the present invention, the internal combustion engine comprises intake air flow adjusting means which is disposed in an intake system and is actuated by means of operating a driver-operable member; fuel supply means for adjusting fuel supply amount for the internal combustion engine; and ignition means for igniting the internal combustion engine. The driving condition detecting means comprises acceleration requirement detecting means for detecting operational amount of the driver-operable member as acceleration requirement information of the driver. The objective transmission ratio setting means sets the objective transmission ratio according to the operational amount of the driver-operable member detected by the acceleration requirement detecting means. The internal combustion engine controlling means comprises first engine torque controlling means for setting objective air fuel ratio and objective spark timing according to the transmission auxiliary torque calculated by the transmission auxiliary torque calculating means to control the fuel supply means according to the objective air fuel ratio as well as control the igniting means according to the objective spark timing.

Thus, the objective air fuel ratio and the objective spark timing are set according to the transmission auxiliary torque and the fuel supply means is controlled such that this objective air fuel ratio can be obtained, and the igniting means is controlled so as to achieve this objective spark timing. Accordingly, the internal combustion engine enables the generation of optimum torque without causing slip of the steel belt and shock resulting from over-power.

In a control device for an internal combustion engine and a continuously variable transmission according to a fifth aspect of the present invention, the internal combustion engine comprises, in its intake system, intake air flow adjusting means which is independently controllable from the operation of a driver-operable member. The driving condition detecting means comprises operational amount detecting means for detecting operational amount of the driver-operable member. The internal combustion engine controlling means comprises target power detecting means for obtaining target output information of the driver according to the operational amount of the driver-operable member detected by the operational amount detecting means; required torque setting means for setting required torque corresponding to the required output information of the driver and for setting objective engine speed according to the required output information obtained by the required output detecting means; objective engine torque calculating means for setting objective engine torque according to the required torque set by the required torque setting means and the transmission auxiliary torque calculated by the transmission auxiliary torque calculating means; and engine torque controlling means for controlling the intake air flow adjusting means so as to obtain the objective engine torque set by the objective engine torque setting means. The objective transmission ratio setting means sets the objective transmission ratio according to the required engine speed set by the required target torque setting means.

Thus, the required output is set in accordance with the operational amount of the driver-operable member. The required torque and the objective engine speed are set in accordance with the required output. Accordingly, the requirement of the driver is reflected at this time. It is possible to select engine output which satisfies the requirement of the driver and also possible to select the optimum transmission ratio for the continuously variable transmission. This results in more improved driving feelings.

BRIEF DESCRIPTION OF THE DRAWINGS

FIG. 24 is a schematic plane view of an engine where the device illustrated in FIGS. 22 and 23 is mounted.

FIG. 25(a) shows a map for setting the number of disconnected cylinders in the device illustrated in FIG. 24;

FIG. 25(b) shows a map designating the disconnectable cylinders in the device illustrated in FIG. 24;

FIG. 26 is a characteristic curve of a dowel angle calculating map for use in the device illustrated in FIGS. 22 and 23;

FIG. 35 is a functional block diagram of an electronic control device in the control device for an internal combustion engine and a continuously variable transmission according to another embodiment of the present invention;

DETAILED DESCRIPTION OF THE PREFERRED EMBODIMENT

Figure 1:
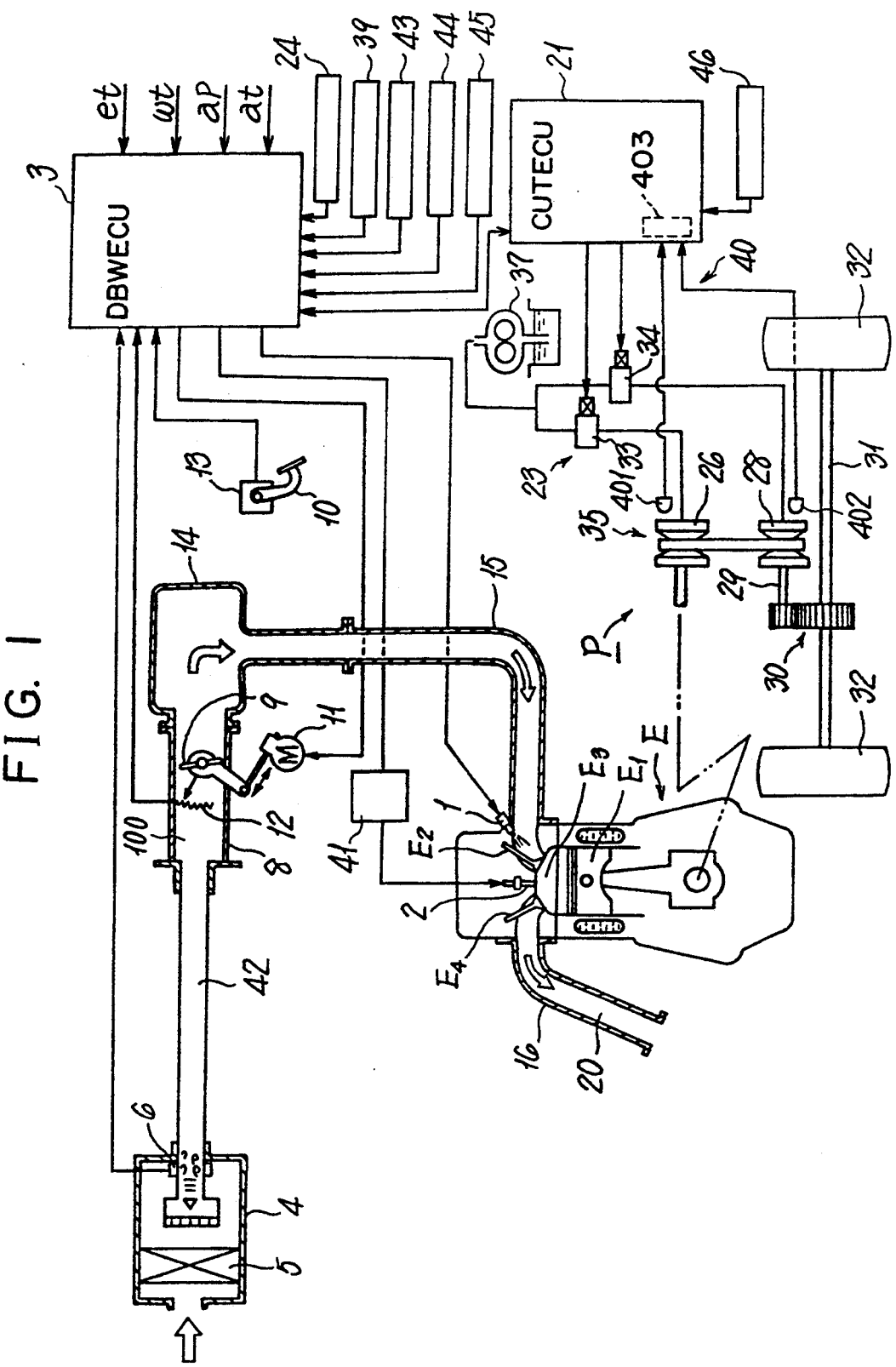
FIG. 1 is a whole structural diagram of an output control device for an internal combustion engine according to one embodiment of the present invention.
Figure 2:
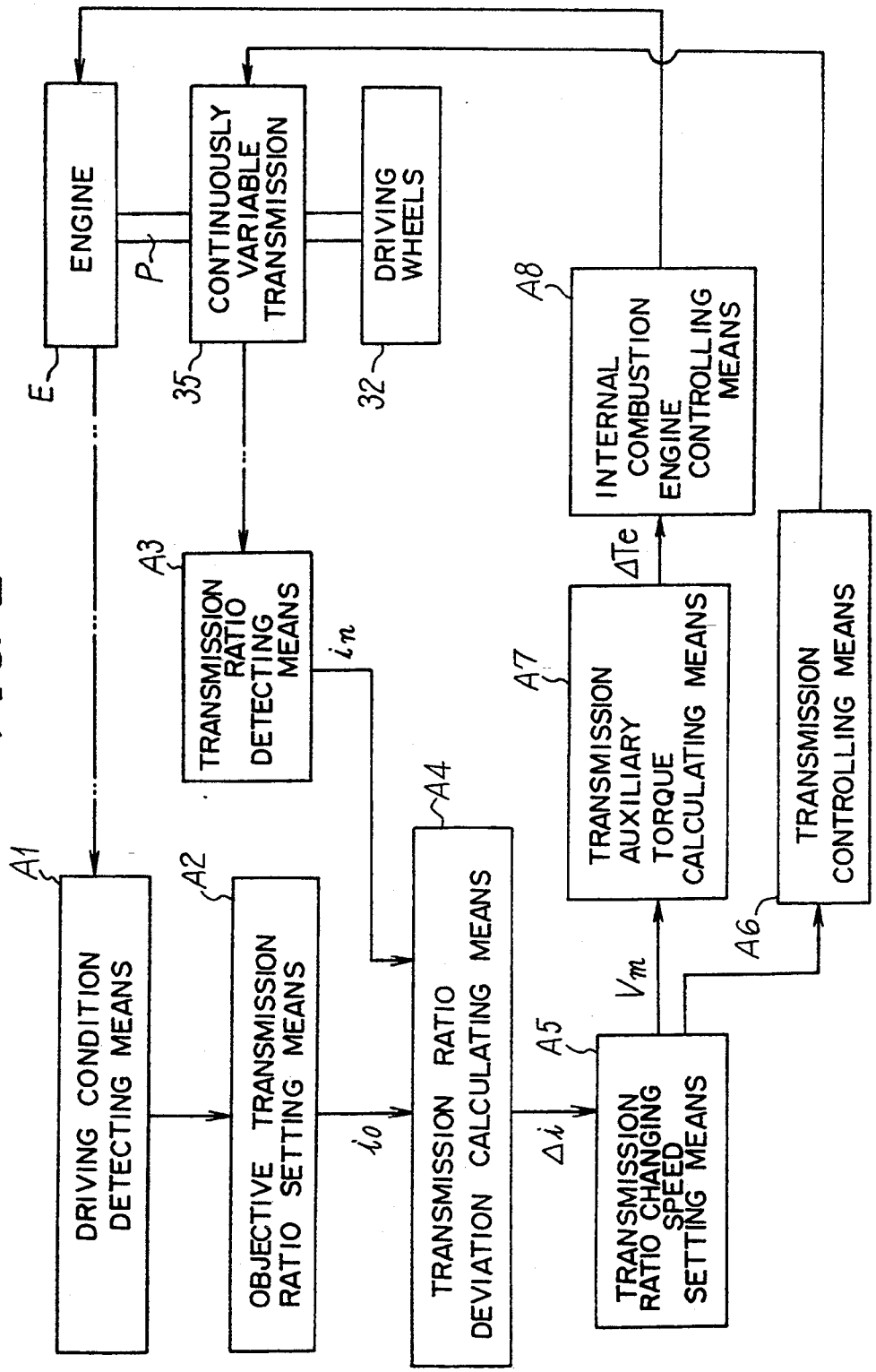
FIG. 2 is a block diagram for a structure of the present invention.

FIG. 1 shows a schematic diagram of a gasoline engine system (hereinafter, referred to as an engine system) and a power transmission system P, which utilizes a control device according to the present invention for controlling an internal combustion engine and a continuously variable transmission. FIG. 2 shows a block diagram of a control device for an internal combustion engine and a continuously variable transmission according to the present invention.

The present invention basically controls both the engine E mounted on a vehicle and the continuously variable transmission (CVT) 35 which is disposed in the power transmission system P between the engine E and driving wheels 32 and of which transmission ratio i can be continuously changed. In particular, the present invention comprises driving conditions detecting means A1 for detecting driving conditions of the vehicle; objective transmission ratio setting means A2 for setting an objective transmission ratio io for the continuously variable transmission 35 according to the driving condition detected by the driving condition detecting means; transmission ratio detecting means A3 for detecting an actual transmission ratio in of the continuously variable transmission ratio 35; transmission ratio deviation calculating means A4 for calculating a deviation $\Delta i$ between the objective transmission ratio io and the actual transmission ratio in; transmission ratio changing speed setting means A5 for setting transmission ratio changing speed Vm which is a changing rate of the transmission ratio according to the transmission ratio deviation $\Delta i$; transmission controlling means A6 for controlling the continuously variable transmission 35 such that the transmission ratio changing speed Vm can be obtained; transmission auxiliary torque calculating means A7 for calculating transmission auxiliary torque $\Delta Te$, which is consumed for transmission operation of the continuously variable transmission 35 according to the transmission ratio changing speed Vm; and internal combustion engine controlling means A8 for controlling output of the engine E according to the transmission auxiliary torque $\Delta Te$.

Thus, the present invention basically calculates the transmission ratio changing speed Vm corresponding to the deviation $\Delta i$ between the objective transmission ratio io and the actual transmission ratio in to control the transmission operation of the continuously variable transmission 35 at the transmission ratio changing speed Vm. It is possible to control the engine E so as to generate output in consideration with the transmission auxiliary torque $\Delta Te$ according to the transmissions ratio changing speed Vm. Therefore, the transmission ratio of the continuously variable transmission is changeable at a suitable transmission ratio changing speed and the internal combustion engine can generate the output corresponding to the torque which is consumed on transmission operation. This results in a reduction of the transmission shock caused by the transmission operation of the continuously variable transmission.

Now, a whole structure of the engine system and the power transmission system P illustrated in FIG. 1 will be described below.

The engine system comprises an electronically controlled injection four-cycle engine E and variable device such as an injector 1 by which fuel is sprayed and injected and a spark plug 2 for ignition which are controlled by a DBWECU 3 which acts as electronic control means for the engine. In addition, the DBWECU 3 is connected to a CVTECU 21 which acts as the electronic control means for the continuously variable transmission (CVT) 35. Both ECUs 3 and 21 are connected with each other through a communication line for allowing them to send and receive signals at any time therebetween.

The DBWECU 3 is connected to an actuator 11 for actuating a throttle valve 9 which serves as intake air flow adjusting means which is driven without being affected by the operation of an accelerator pedal 10, and which serves as a driver-operable member. The CVTECU 21 is connected to a hydraulic actuator 23 for hydraulically controlling the transmission ratio changing speed of the continuously variable transmission 35.

An entire construction of the engine system will be described below mainly along a direction which the air flows therethrough.

Intake air taken through an air cleaner element 5 is subjected to an air flow sensor 6 of the Karman vortex type which acts as intake air flow detecting means to detect the air flow and is delivered to a throttle body 8 through a suction pipe 42. Inside of the air cleaner body 4, apparatus such as an atmospheric pressure sensor and an atmospheric temperature sensor, which are not shown, are disposed besides the air flow sensor 6 to determine data on the intake air such as an atmospheric pressure ap and an atmospheric temperature at supplied to the DBWECU 3 in a well-known manner.

The intake air flow into the throttle body 8 is controlled by means of the throttle valve in a butterfly shape. The throttle valve 9 is not actuated by the accelerator pedal 10 stepped by the driver. It is actuated by an actuator (in this embodiment, a stepping motor 11). In this embodiment, so called DBW (drive by wire) method is applied where the actuator 11 is controlled by the DBWECU 3. In this figure, a reference numeral 12 represents a throttle position sensor (hereinafter, a throttle sensor) for supplying opening information relating to the throttle valve 9, and a detection signal thereof is supplied to the DBWECU 3.

The accelerator pedal 10 is connected to an accelerator opening sensor 13 of a potentiometer type which acts as accelerator requirement detecting means. The stepping amount $\theta a$ of the accelerator pedal is supplied to the DBWECU 3 after being converted to an electric signal as acceleration requirement information for a driver.

The intake air flowing into the throttle body 8 is delivered through a surge tank 14 to an intake manifold 15. The intake air flows to the downstream of the intake manifold 15, where the fuel is injected from the injector 1 controlled by the DBWECU 3. Thus, the intake air and the fuel become the air fuel mixture. The air fuel mixture is poured into a combustion chamber E3 by opening a suction valve E2 disposed in the engine E. The air fuel mixture is then ignited by using the spark plug 2 at or around a top dead center. After completion of the explosion/expansion stroke, the air fuel mixture is supplied into an exhaust manifold 16 of an exhaust path 20 as exhaust gas by opening an exhaust valve E4 and is sent through an exhaust gas purification system which is not shown. After the removal of toxic components, the exhaust gas is discharged to the outside through a muffler which is not shown. Reference numeral 24 represents an engine speed sensor for supplying engine speed information and reference numeral 39 represents a water temperature sensor.

Figure 4:
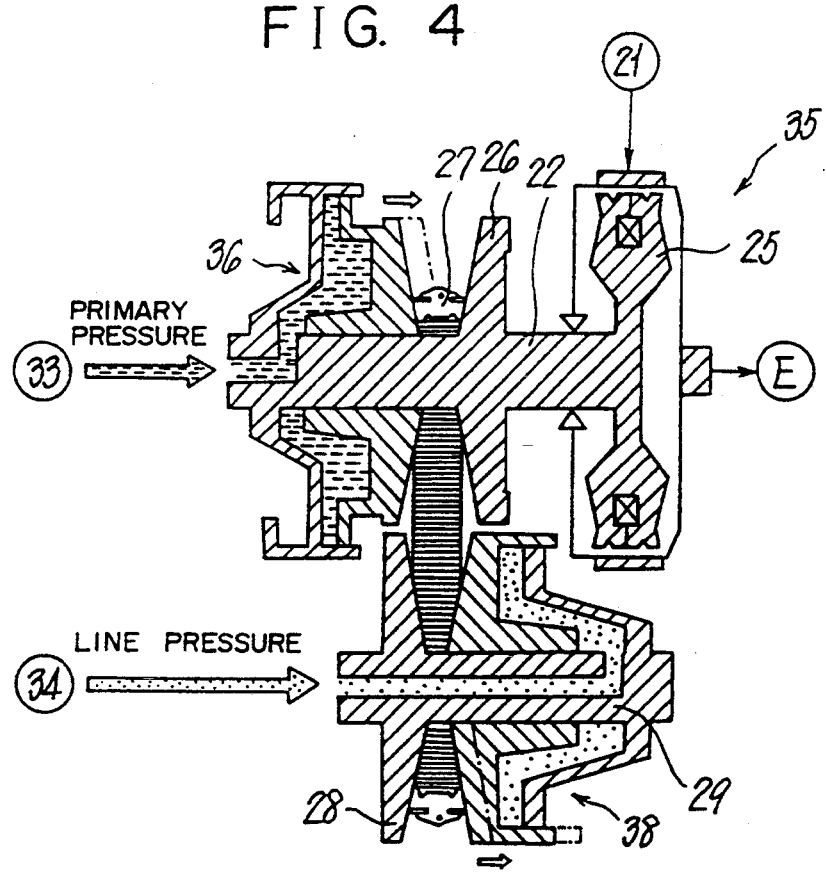
FIG. 4 is a sectional view of the continuously variable transmission applied to the device illustrated in FIG. 1.

On the other hand, the engine E is connected to the power transmission system P and is also connected via a crank shaft connected to the continuously variable transmission 35 illustrated in FIG. 4. An output shaft of an electromagnetic clutch 25 is coupled to a primary shaft 22 of the continuously variable transmission 35. The primary shaft 22 is united with a pair of primary pulleys (stationary and movable pulleys) 26 where a steel belt 27 passes through. The steel belt 27 passes between the primary pulleys 26 and a pair of secondary pulleys (stationary and movable pulleys) 28. The secondary pulleys 28 are united with a secondary shaft 29. The secondary shaft 29 is constructed such that the turning effort is transmitted to driving wheels 32, which are coupled to a driving shaft 31 via a reduction gear train 30 and a differential gear which is not shown.

One the primary pulley (i.e. movable pulley) 26 serves as a part of a piston unit of a hydraulic actuator 36. A primary pressure is transmitted to the actuator 36 through a first solenoid valve 33 from a hydraulic source 37. Similarly, one of a pair of the secondary pulleys 28 serves as a part of a piston unit of a hydraulic actuator 38. A line pressure is transmitted through a second solenoid valve 34 to the hydraulic source 37.

Therefore, the effective diameter of each pulley can be relatively changed according to the opening/closing ratio (duty ratio) of the first and the second electromagnetic valves 33 and 34, respectively. In this manner, the transmission ratio can be changed by means of changing engagement of the steel belt 27 with the pulleys.

Both solenoid valves 33 and 34 are constructed in a manner that they can be operatively controlled in response to an output of the CVTECU 21. Reference numeral 39 represents a vehicle speed sensor for producing vehicle speed information, and reference numeral 40 represents a transmission ratio detecting sensor for supplying transmission ratio information of the continuously variable transmission 35. The transmission ratio detecting sensor 40 comprises a pair of rotary sensors 401 and 402 for detecting rotation speed Wcf and Wcr of the primary pulleys 26 and the secondary pulleys 28, respectively, and an arithmetic unit 403 which calculates an actual transmission ratio in (=Wcf/Wcr).

In addition, reference numeral 44 represents a crank angle sensor for producing crank angle information of the engine. Reference numeral 45 represents a knocking sensor for producing knocking information of the engine. Reference numeral 43 represents a linear air fuel ratio sensor which can output air fuel ratio variation data in a continuous manner for all air fuel zones.

Now, each of the DBWECU 3 and the CVTECU 21, which act as the electronic control means, is mainly implemented by a microcomputer. A memory circuit constituted therein memorizes and processes each control program such as the transmission ratio corresponding engine speed calculating maps illustrated in FIG. 5, the torque calculating maps illustrated in FIG. 6, the throttle valve opening calculating map illustrated in FIG. 7, the engine output control processing routine illustrated in FIG. 8, the CVT control processing routine illustrated in FIG. 9, and the main routine of the DBWECU 3 illustrated in FIG. 10.

Figure 3:
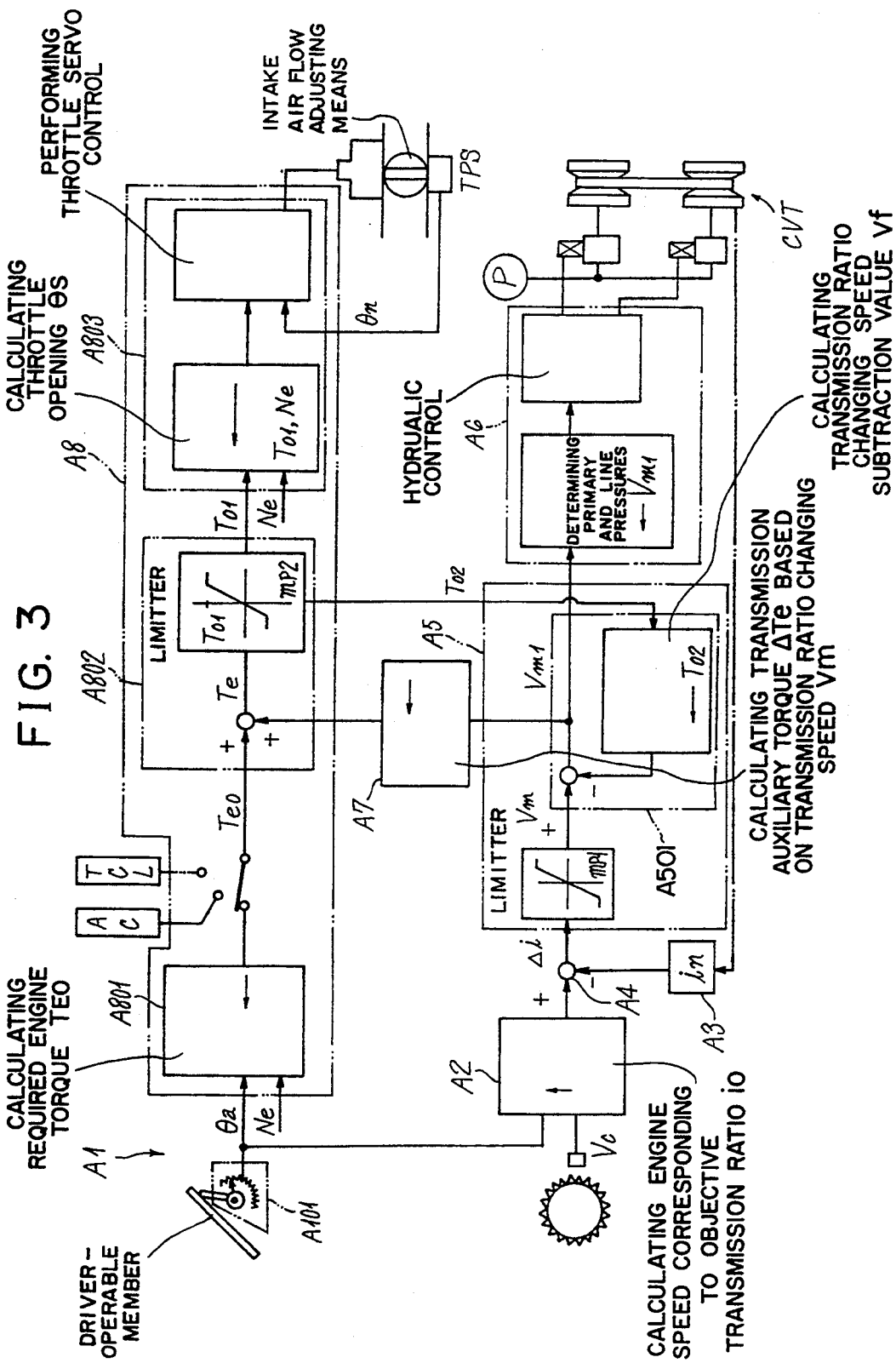
FIG. 3 is a functional block diagram of an electronic control device applied to the device illustrated in FIG. 1.

The DBWECU 3 and the CVTECU 21 have functions illustrated in FIG. 3.

The driving condition detecting means A1 detects an operational amount of the driver-operable member as acceleration requirement information of the driver. In this embodiment, driving condition detecting means A1 includes acceleration requirement detecting means A101 (in this embodiment, an accelerator opening sensor 13 is employed). The objective transmission ratio setting means A2 sets the objective transmission ratio io for the continuously variable transmission 35 according to the operational amount of the driver-operable member. The transmission ratio detecting means A3 detects the actual transmission ratio in of the continuously variable transmission 35. The transmission ratio deviation calculating means A4 calculates the deviation $\Delta i$ between the objective transmission ratio io and the actual transmission ratio in. The transmission ratio changing speed setting means A5 sets the transmission ratio changing speed Vm, which is a changing rate of the transmission ratio, according to the transmission ratio deviation $\Delta i$. The transmission controlling means A6 controls the continuously variable transmission 35 such that the transmission ratio changing speed Vm can be obtained. The transmission auxiliary torque calculating means A7 calculates the transmission auxiliary torque ΔTe, which is consumed on transmission operation of the continuously variable transmission 35, according to the transmission ratio changing speed Vm. The required torque setting means A801 included in the internal combustion engine controlling means A8 sets the required torque Teo as the torque which is necessary for acceleration required by the driver. The objective engine torque setting means A802 sets the objective engine torque To1 according to the required torque Teo and the transmission auxiliary torque ΔTe. The engine torque controlling means A803 controls the output of the engine E according to the torque To1.

Particularly in this embodiment, the required engine torque setting means A802 divides the torque Te, obtained by adding the required torque Teo to the transmission auxiliary torque ΔTe, into the actually realizable torque To1 and the remaining undertorque To2 (=Teo−To1) to set the actually realizable torque To1 as the objective engine torque. The transmission ratio changing speed correcting means A501 as the transmission speed setting means A5 corrects the transmission ratio changing speed Vm according to the undertorque To2 to produce modified transmission ratio changing speed Vm1.

Description will be made below regarding to the control device for the internal combustion engine and the continuously variable transmission illustrated in FIGS. 1 and 3 in conjunction with control programs illustrated in FIGS. 8 through 10.

In this embodiment, the DBWECU 3 and CVTECU 21 illustrated in FIG. 1 are carried out in operation when the engine system E is driven by operating an ignition key which is not shown.

Figure 10:
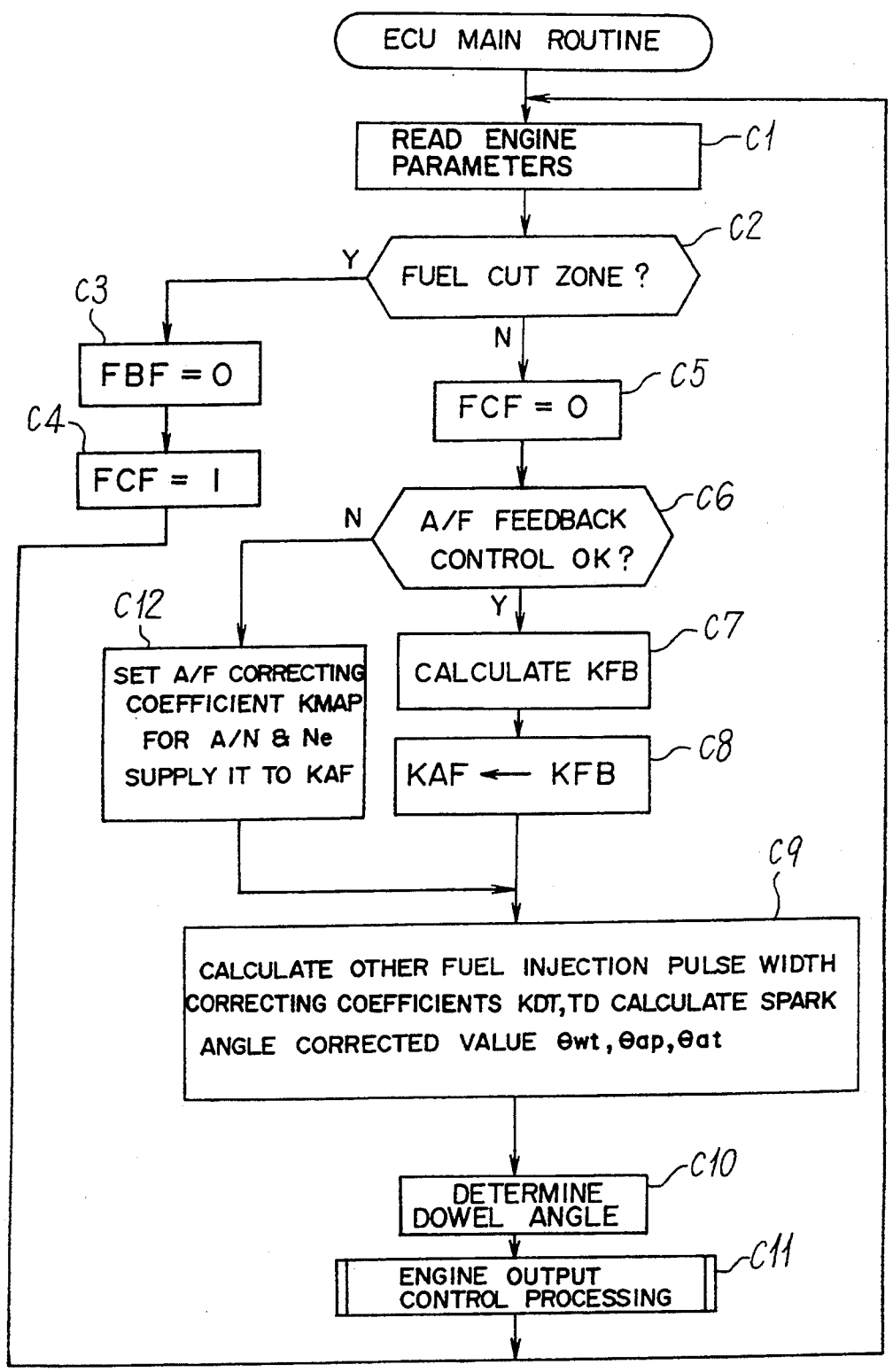
FIG. 10 is a flow chart of an ECU main routine carried out by the device illustrated in FIG. 1.

As the control is started, the DBWECU 3 carries out a main routine illustrated in FIG. 10. At the beginning of the main routine, initialization operation which is not shown is carried out at step c1 to read data detected by the sensors and store them in a predetermined area.

Step c2 determines whether or not fuel cut is carried out in the engine on the basis of an engine speed Ne and engine load information (the intake air flow A/N in this embodiment). If fuel-cutting is in progress, the control passes to step c3 to clear an air fuel feedback flag FBF, and a fuel cut flag FCF is set to 1 at step c4. Then, the control returns to the step c1.

When the fuel-cutting is not performed, the control advances to steps c5 and c6. The fuel cut flag FCF is reset, and whether or not a well-known air fuel ratio feedback condition is satisfied is determined. When this condition is not satisfied due to, for example, a transient driving state such as a power driving state of the engine, an air fuel ratio correction coefficient KMAP is calculated at step c12 depending on the current driving conditions (A/N, N). This value is stored in an address KAF. Subsequently, the control passes to step c9.

When step c7 is carried out because the air fuel feedback condition is satisfied, a correcting value KFB is calculated in accordance with the feedback control constant based on the data detected by the air fuel ratio sensor 43.

The value is stored in the address KAF, and the control process proceeds to the step c9.

At the step c9, a fuel injection pulse width correcting coefficient KDT and a dead time correcting value TD for the fuel injection valve are set according to the driving condition. In addition, various correcting values are calculated to determine a spark timing θadv by using the following equation (1). Then, the control passes to step c10.

$$\theta adv = \theta b + \theta wt + \theta ap + \theta at + \theta ret \quad (1)$$

The correcting values are a water temperature correcting value θwt to advance the spark timing depending on decrease of the water temperature, an atmospheric pressure correcting value θap to advance the spark timing depending on the decrease of the atmospheric pressure, and an intake air temperature correcting value θat to advance the spark timing depending on the decreases of intake air temperature. These correcting values are stored in the predetermined area.

At step c10, a dowel angle is determined by using, for example, a map illustrated in FIG. 26 in such a manner that it increases as the engine speed Ne increases.

Thereafter, an engine power control processing is carried out at step c11 and then the control returns to the step c1.

Figure 7:
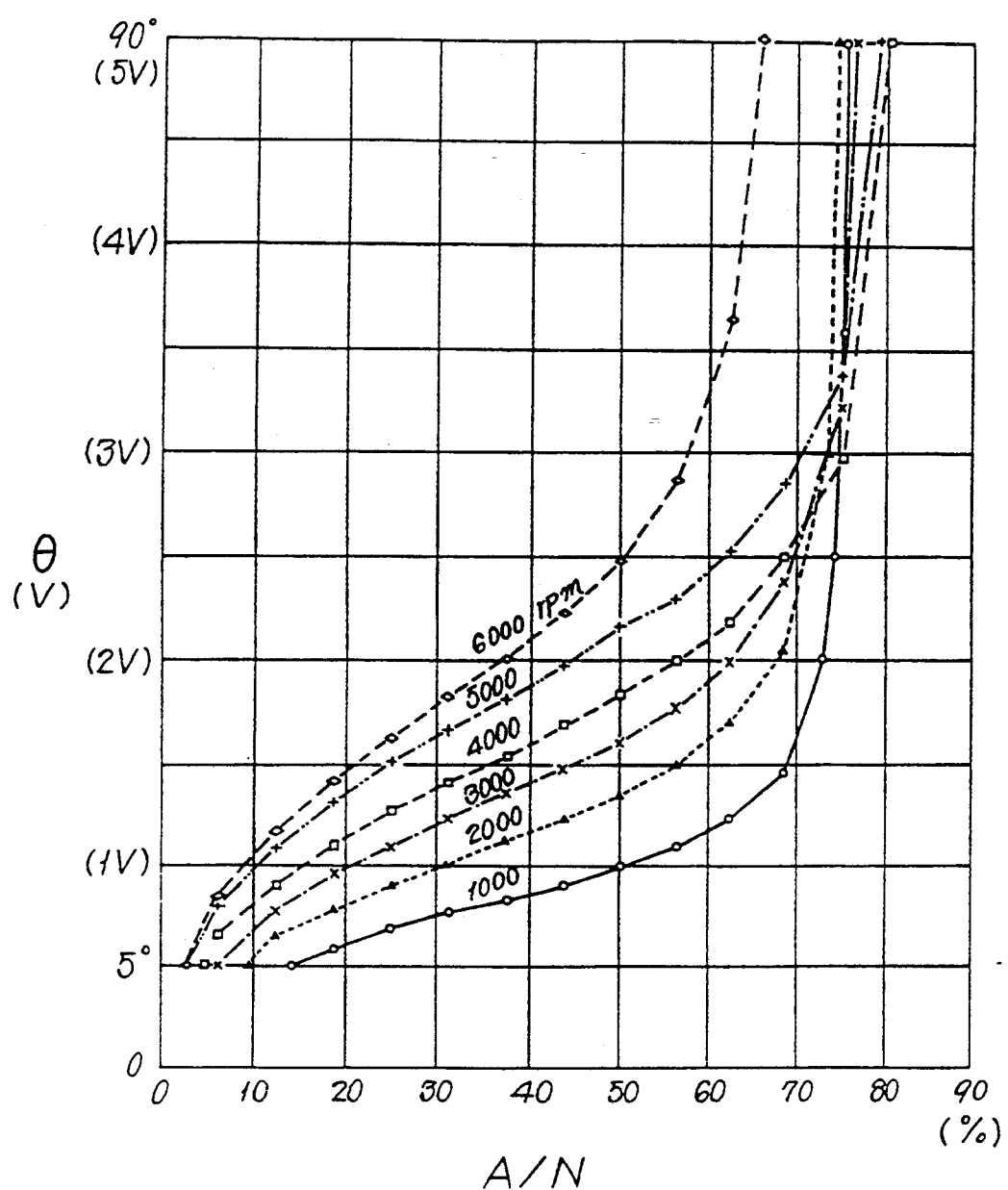
FIG. 7 is a characteristic curve of a throttle valve (accelerator) opening/intake air flow calculating map for use in output control carried out by the device illustrated in FIG. 1.
Figure 8:
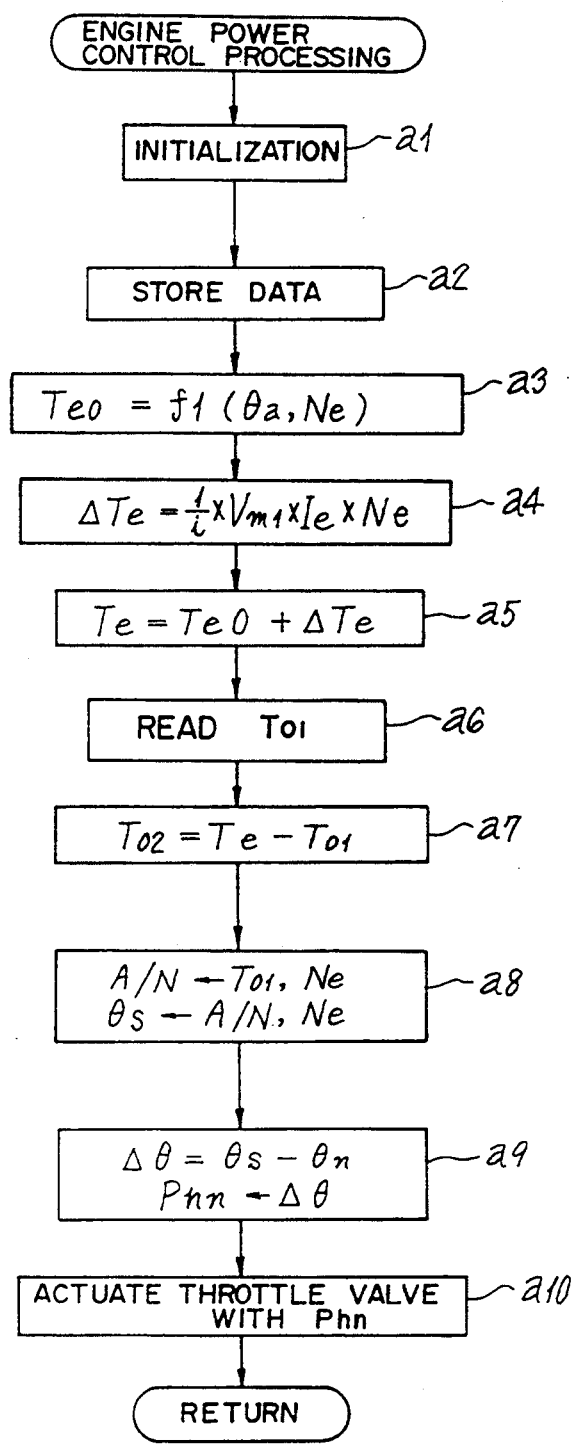
FIG. 8 is a flow chart of an engine output control processing routine carried out by the device illustrated in FIG. 1.

In FIG. 8, the engine power control processing carried out at the step c11 is shown. In this event, first, step a1 carries out initialization operation. At step a2, sensed data, information such as the accelerator opening θa and the engine speed Ne are stored in a predetermined area. Step a3 calculates the required torque Teo with respect to the throttle valve opening θa and the engine speed Ne by means of the intake air flow/torque calculating map illustrated in FIG. 6, and throttle valve (accelerator) opening/intake air flow calculating map illustrated in FIG. 7. At step a4, Δte which is considered as being necessary for transmission operation is calculated with the transmission speed Vm1 according to the following equation (6)'.

It is noted that the equation (6)' for calculating the transmission auxiliary torque is derived as follows.

Figure 11:
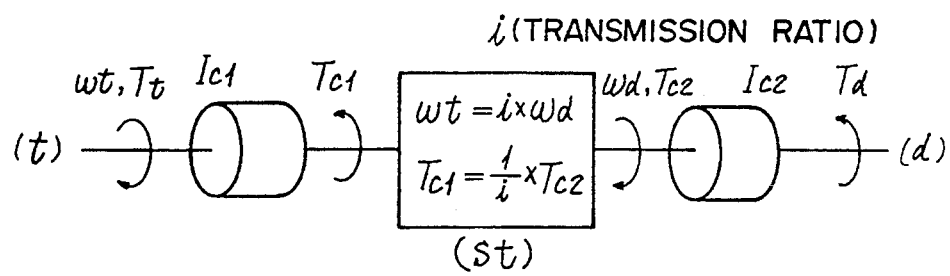
FIG. 11 is a schematic view of a dynamic model indicating dynamic function of the CVT in the device illustrated in FIG. 1.

That is, in the dynamic model of the CVT as illustrated in FIG. 11, the primary pulley 26 having a moment of inertia Ic1 is supplied with an input of the torque Tt at an angular velocity of ωt from a torque converter (t) and the torque Tt is transmitted to the steel belt (st). The secondary pulley 28 having a moment of inertia Ic2 is supplied with an input of the torque Tc2 at an angular velocity of ωd from the steel belt (st) and the torque Tc2 is transmitted to a driving output(d). In this way, the torque Tc1 is inputted and the torque Tc2 is outputted through the belt (st) between both pulleys when the transmission processing is carried out to attain the transmission ratio in. The kinetic equations for the primary and secondary pulleys are expressed by equations (3) and (4).

$$Ic1 \times (d\omega t/dt) = Tt - Tc1 \quad (3)$$

$$Ic2 \times (d\omega d/dt) = Tc2 - Td \quad (4)$$

This event, $$d\omega t/dt = d(i \times \omega d)/dt = (di/dt) \times \omega d + i \times (d\omega d/dt),$$

and $$Tc1 = (1/i) \times Tc2$$

can be obtained, and the equation (3) is rewritten by the results of this equation, namely, $$lc1 \times (di/dt) \times \omega d + in \times lc1 \times (d\omega d/dt)$$
$$= Tt - (1/in) \times Tc2 \qquad (3)'$$

The equation (3)' is multiplied by in to add to both terms of the equation (4). Further, the resultant equation is rearranged in consideration of $\omega t = i \times \omega d$, $$d\omega d/dt = (i \times Tt - Td)/(lc2 \times i^2 \times lc1) - (lc1 \times (di/dt) \times 107\ t)/(lc2 + i^2 \times lc1) \qquad (5)$$

can be obtained.

As well known in the art, the transmission ratio changing speed di/dt is controlled by changing they hydraulic pressure P applied to the pulleys. Accordingly, the following equation is obtained.

$$di/dt = f(p),\ imin < i < imax$$

where the equation (5) is substituted by $c1 = t = e$, $c2 = d = v$ and the torque Td of the output shaft (d) is substituted by transmission torque Tr1 transmitted by the transmission and torque corresponding to the loss $T_L$ consumed by the transmission, namely, $$d\omega d/dt = (i \times Te - T_{RL} - T_L)/(lexi^2 + lv)$$
$$((di/dt) \times lex\omega e)/lexi^2 + lv),$$

where the second term represents the torque value depending on variation of the transmission ratio changing speed di/dt and transmission auxiliary torque $\Delta Te$, which can be corrected so as to eliminate the affect of the foregoing torque value, is $$(i \times \Delta Te)/(lexi^2 + lv) - ((di/dt) \times lex\omega e)/(lex\omega e)/(lex\text{-}i^2 + lv) = 0,$$

thereby, $$i \times \Delta Te = (di/dt) \times lex\omega e.$$

Accordingly, $$\Delta Te = (1/i) \times (di/dt) \times lex\omega e \qquad (6)$$
$$= (1/i) \times Vm1 \times lexNe \qquad (6)'$$

and $$di/dt = Vm = ix(1/(lex\omega e) \times \Delta Te \qquad (7)$$

can be obtained. Here, we corresponds to the engine speed.

In this way, after calculating the transmission auxiliary torque $\Delta Te$ at step a4 by the equation (6)', step a5 calculates the objective engine torque Te' by adding the required torque Teo to the transmission auxiliary torque $\Delta Te$.

In place of calculating the required torque Teo at the step a3, the target torque Teo may be read by means of an auto cruise control system or a traction control system. At step a6, limiter processing is carried out. First, torque To1 which can be realized under the current driving condition is read as the objective engine torque. The subsequent step a7 subtracts the realizable torque To1 from the torque Te' to calculate the undertorque To2, which is sent to the CVTECU 21.

Subsequently, in order to achieve the realizable torque To1, opening of the throttle valve 9 is controlled. At step a8, the intake air flow A/N is calculated with respect to this realizable torque To1 and the current engine speed Ne (see the map illustrated in FIG. 6). Then the throttle valve opening $\theta$s is calculated based on the intake airflow A/N and the engine speed Ne (see the map illustrated in FIG. 7). Then, a deviation $\Delta\theta$ is calculated between the current throttle valve opening $\theta$n and $\theta$s at step a9. Further, the pulse value Phn is calculated to eliminate the deviation $\Delta\theta$. A servo 11 is actuated to adjust the throttle valve to the opening $\theta$s. Thereafter the step returns to the main routine. In this manner, the engine can generate the realizable torque To1 so that the transmission shock caused by undertorque can be eliminated since the transmission auxiliary torque $\Delta Te$ corresponding to the modified transmission ratio changing speed Vm1 can be produced.

Figure 9:
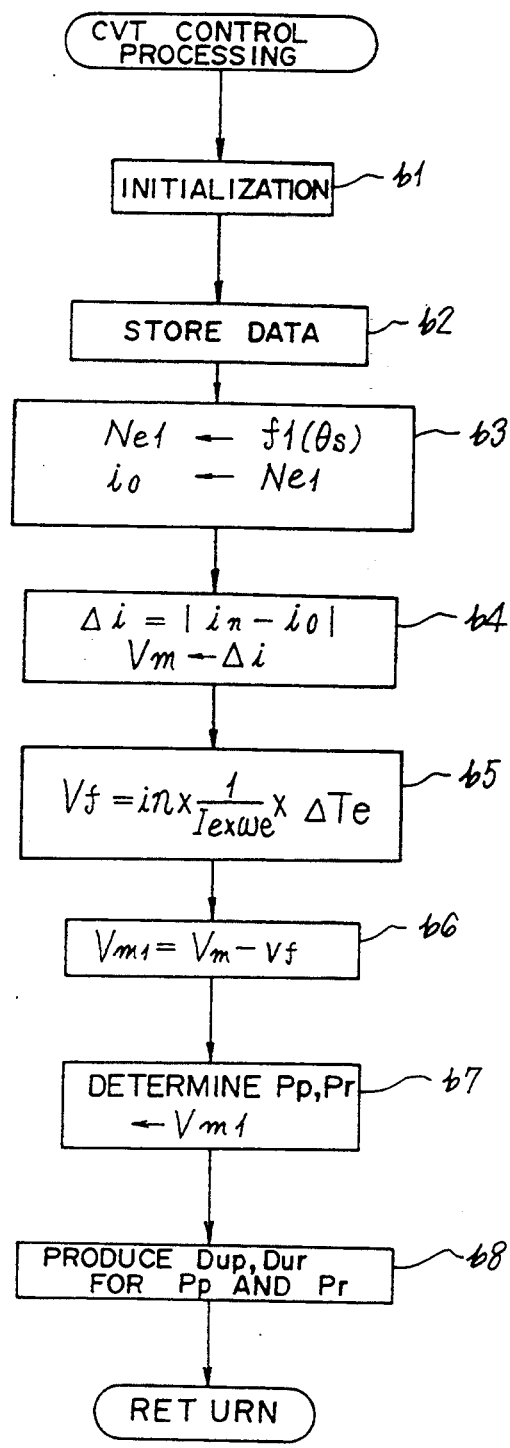
FIG. 9 is a flow chart of a CVT control processing routine carried out by the device illustrated in FIG. 1.

The CVTECU 21 carries out the CVT control processing routine illustrated in FIG. 9. Step b1 carries out initialization operation. Step b2 reads the data detected by each sensor such as the vehicle speed Vc, the throttle valve opening $\theta$a and the actual transmission ratio in to store them in a predetermined area.

Figure 5:
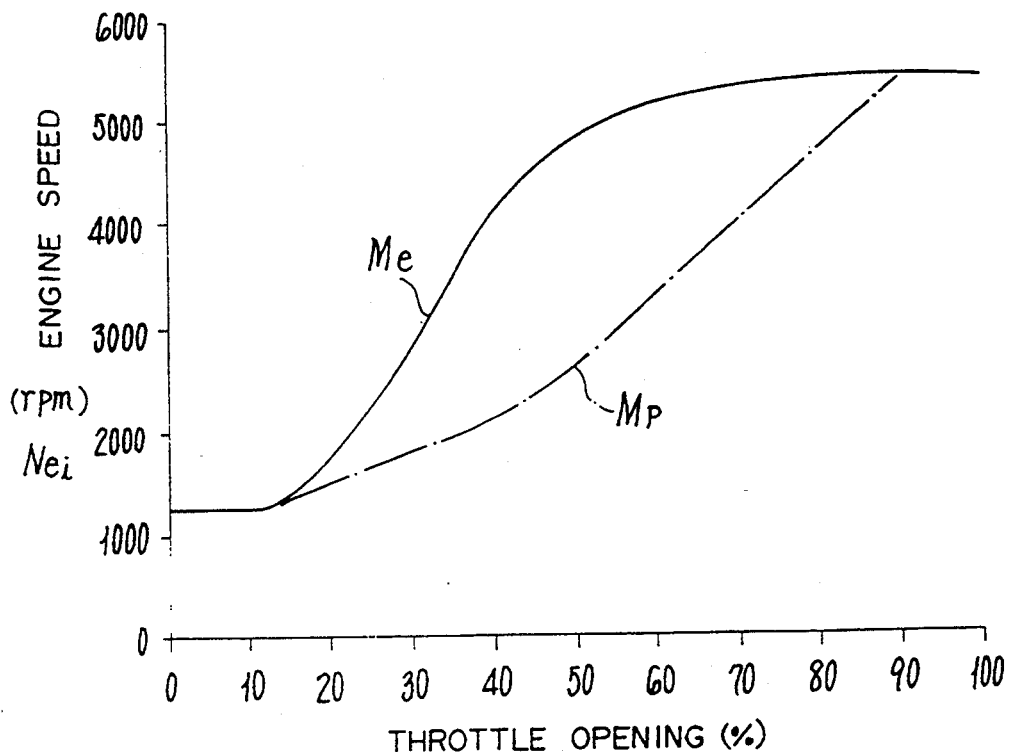
FIG. 5 is a characteristic curve of a transmission ratio corresponding engine speed calculating map for use in output control carried out by the device illustrated in FIG. 1.
Figure 14:
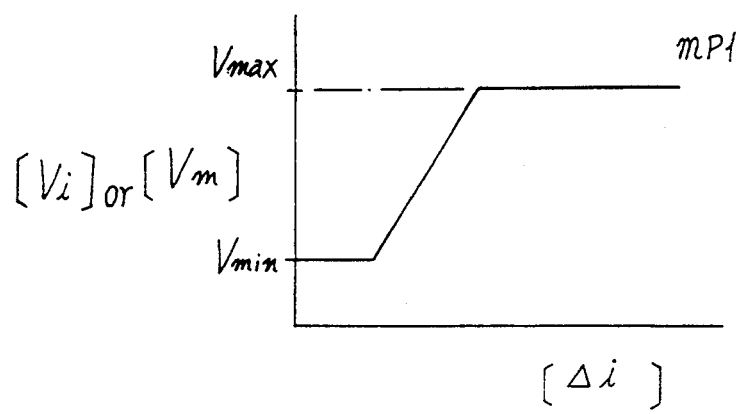
FIG. 14 is a characteristic curve of a transmission speed calculating map for use in the ECU in the device illustrated in FIG. 1.

At step b3, the engine speed Ne1 corresponding to the objective transmission ratio io is calculated by using the map illustrated in FIG. 5. The objective transmission ratio io is determined such that the engine speed Ne1 is maintained. Thereafter, at step b4, the transmission ratio deviation $\Delta i$ between the actual transmission ratio in and the objective transmission ratio io is calculated. Further, the transmission ratio changing speed Vm corresponding to the deviation $\Delta i$ is calculated to be between the maximum and minimum values Vmax and Vmin by using the transmission ratio changing speed calculating map mp1 illustrated in FIG. 14.

Step b5 calculates a transmission speed subtraction value vf (which should be subtracted from the transmission ratio changing speed Vm because of the presence of the undertorque To2) supplied from the ECU 3.

The transmission ratio changing speed subtraction value vf ($=di/dt = inx(1/lex\omega e)) \times \Delta Te$) is calculated by using the above mentioned equation (7), where $\Delta To2$ is substituted by $\Delta Te$.

At step b6, the transmission ratio changing speed subtraction value vf is subtracted from the transmission ratio changing speed Vm to obtain the modified transmission ratio changing speed Vm1.

Figure 12A:
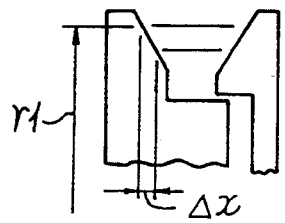
FIG. 12(a) is a schematic view of a part of an operational model representing a pulley portion in the CVT of the device illustrated in FIG. 1.

At step b7, the primary pressure Pp and the line pressure Pr (in particular, this embodiment is designed so as to continuously apply the constant line pressure Pr to the secondary pulley 28) are determined for the corrected transmission ratio changing speed Vmi by using a map (see FIG. 12 (b)).

As shown in FIG. 12 (a), the effective diameter r1 of the pulleys is considered as being directly proportional to the shift amount $\Delta x(=(1/S) \times Qdt$, where 1/S represents a proportional constant) of the pulleys in the continuously variable transmission 35. The transmission ratio changing speed Vm(=di/dt) corresponding to the variation of the transmission ratio i is also considered as being directly proportional to the variation of the effective diameter r1 of the pulleys (dr1/dt). Accordingly, the following equation can be derived from the proportional relations, $$d(\Delta x)/dt = 1/(S \times Q) = (1/S) \times \sqrt{(k\Delta p)} \qquad (8)$$

Figure 12B:
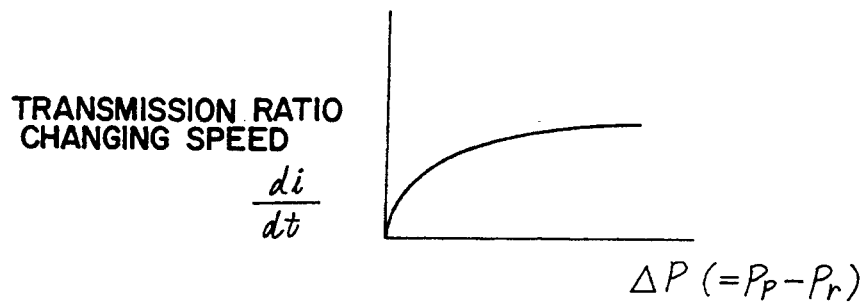
FIG. 12(b) is a characteristic curve of a transmission speed calculating map for use in the CVT in the device illustrated in FIG. 1.

By using this equation (8), the diagram as illustrated in FIG. 12(b) can be obtained.

In FIG. 12(b), $\Delta p$ (primary pressure Pp) is considered to represent a pressure difference (which is proportional to the fuel flow) in feeding paths of the hydraulic chambers of the pulleys. The primary pressure Pp is determined in accordance with the transmission ratio changing speed Vm1 (di/dt).

Thereafter, step b8 is carried out to set the duty ratios Dup and Dur with which the primary and line pressures Pp and pR can be maintained. The first and the second solenoid valves 33 and 34 are duty-controlled with respect to the values Dup and Dur. Thus, the actual transmission ratio in of the continuously variable transmission 35 approaches the objective transmission ratio io. In addition, the transmission ratio changing speed corresponding to the undertorque To2 is substrated to prevent sudden transmission. This results in elimination of shock and slip of the steel belt 27 caused by an excessive output.

As described so far, the CVTECU 21 calculates the subtraction value vf of the transmission ratio changing speed, which corresponds to the undertorque To2, to actuate the continuously variable transmission 35 at the modified transmission ratio changing speed Vm1. Alternatively, the continuously variable transmission 35 may be actuated only at the transmission ratio changing speed Vm. In this case, it is also possible to eliminate the transmission shock caused by undertorque.

As described above, the control device for the internal combustion engine illustrated in FIGS. 1 and 3 takes the transmission auxiliary torque ΔTe, corresponding to the transmission ratio changing speed Vm into consideration. Thus, it is possible to eliminate the transmission shock. Particularly, the transmission ratio changing speed Vm corresponding to the undertorque To2 is subtracted to prevent sudden transmission. Accordingly, slip of the steel belt and shock can be eliminated. In particular, transmission feeling is improved.

Figure 15:
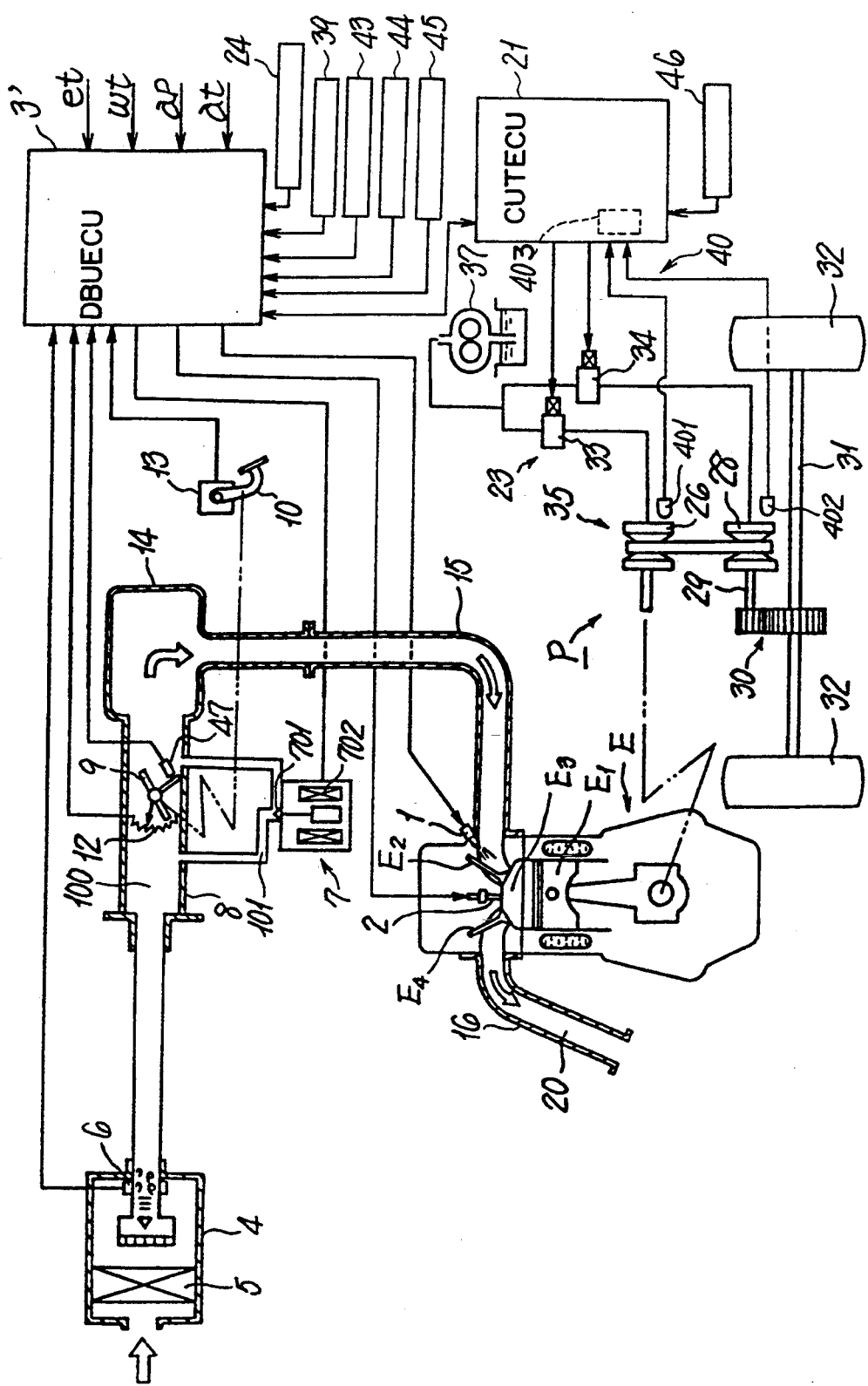
FIG. 15 is a whole structural diagram of an output control device for an internal combustion engine and a continuously variable transmission according to another embodiment of the present invention.

FIG. 15 shows a control device for an internal combustion engine and a continuously variable transmission according to another embodiment of the present invention. The engine E where the control device of this embodiment is mounted comprises similar parts as that illustrated in FIG. 1 except for the structure of an intake air system and a control system. The similar parts are designated by like reference numerals and description of such parts will be omitted.

In this engine E, devices such as the injector 1 from which fuel is sprayed and injected and the spark plug 2 for ignition are controlled by ECU 3' which acts as the electronic control means for the engine. The ECU 3' is connected to an idling speed control valve (hereinafter, referred simply as an ISC valve) 7 which serves as auxiliary suction amount operating means for increasing or decreasing intake air flow without actuating the accelerator. The CVTECU 21 is connected to the hydraulic actuator 23 for hydraulic controlling the transmission ratio changing speed of the continuous variable transmission 35.

The amount of suction air flow into the throttle body 8 is controlled by means of the throttle valve 9 which serves as main intake air flow operating means. The throttle valve in this embodiment is linked such that it is directly cooperated with the accelerator pedal 10 to be stepped by the driver. The accelerator pedal 10 is connected to an accelerator opening sensor 13 of the potentiometer type by which stepping amount θa of the acceleration pedal 10 is detected as the acceleration requirement information of the driver. In FIG. 15, reference numeral 47 represents an idling sensor which indicates that the throttle valve 9 is in an idling position. These detected signals are supplied to the ECU 3'.

A main path 100 of the throttle body 8 includes a bypass 101 arranged in parallel thereto where the intake air flows, detouring the throttle valve 9. The ISC valve 7 arranged in the bypass 101 is constructed as the auxiliary suction amount operation means which contributed to maintain the idling speed of the engine at a set value and which increases or decreases the intake air flow without actuating the accelerator.

The ISC valve 7 employed in this embodiment is implemented as a duty valve which secures valve opening (opening area with which the intake air flow can be increased or decreased) corresponding to the duty ratio Du. The ISC valve 7 comprises a valve body 701 for controlling intake flow through the bypass 101 by means of changing contact to a valve seat, and a solenoid 702 which keeps the bypass 101 at a desired opening and is connected to the ECU 3'.

The ECU 3' carries out the idling speed control by means of the ISC valve 7, and also performs the output control for increasing or decreasing the intake air flow by adequately actuating the ISC valve 7 as the auxiliary suction amount operating means in a manner described below.

Figure 16:
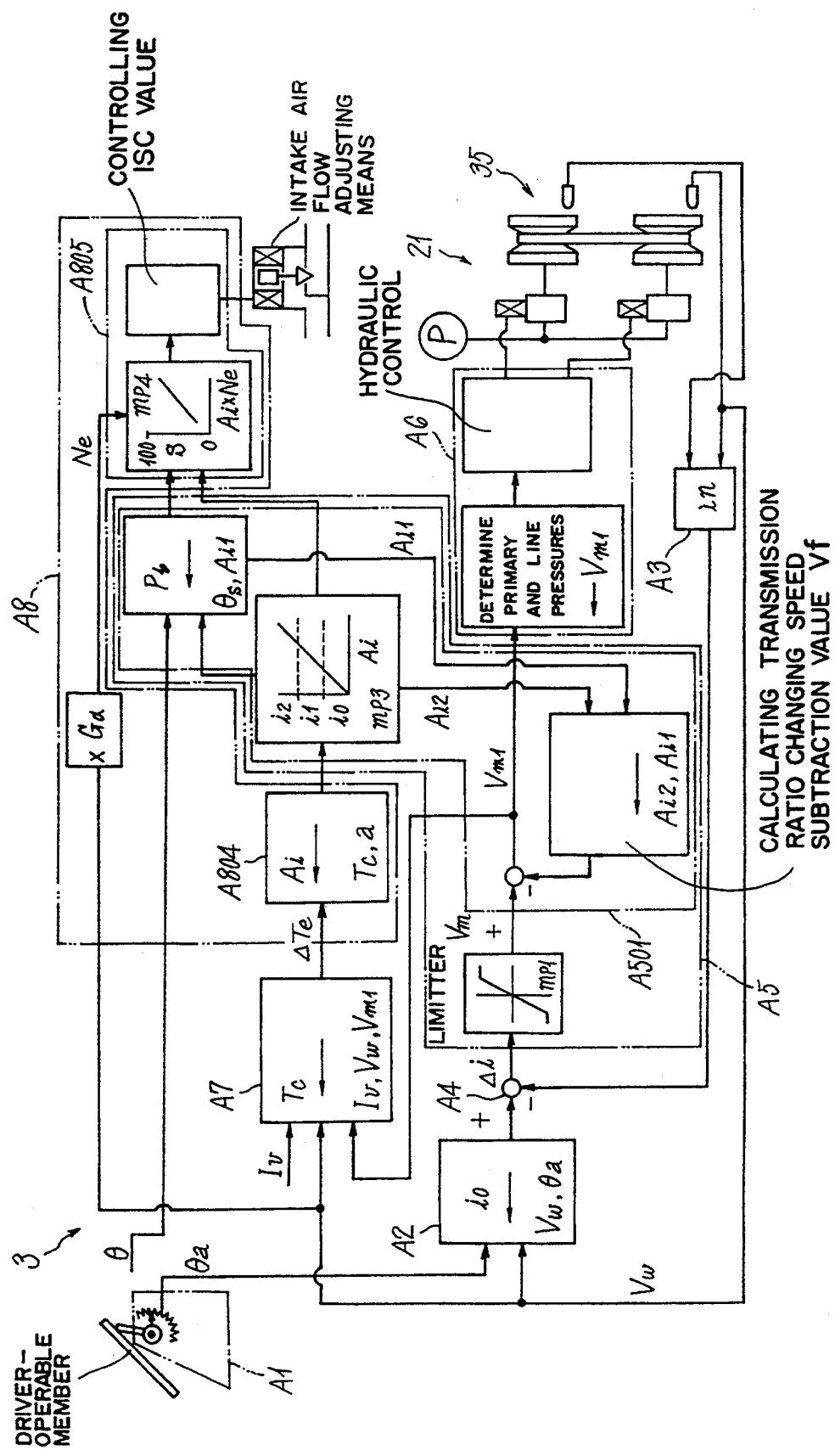
FIG. 16 is a functional block diagram of an electronic control device applied to the device illustrated in FIG. 15.

The ECU 3' and CVTECU 21 function as illustrated in FIG. 16.

The driving condition detecting means A1 detects a driving condition. The objective transmission ratio setting means A2 sets the objective transmission ratio io for the continuously variable transmission 35 according to the driving condition. The transmission ratio detecting means A3 detects the actual transmission ratio in of the continuously variable transmission 35. The transmission ratio deviation calculating means A4 calculates the deviation Δi between the objective transmission ratio io and the actual transmission ratio in. The transmission ratio changing speed setting means A5 sets the transmission ratio changing speed Vm which is a changing rate of the transmission ratio according to the transmission ratio deviation Δi. The transmission controlling means A6 controls the continuously variable transmission 35 such that the transmission ratio changing speed Vm can be obtained. The transmission auxiliary torque calculating means A7 calculates the transmission auxiliary torque ΔTe, which is consumed by the transmission operation of the continuously variable transmission 35, according to the transmission ratio changing speed Vm. Auxiliary intake air flow setting means A804 included in the internal combustion engine controlling means A8 calculates an auxiliary intake air flow Ai. Auxiliary intake air flow is necessary for obtaining the torque, according to the transmission auxiliary torque ΔTe. Auxiliary intake air flow controlling means A805 also included in the means A8 controls the intake air flow adjusting means (the ISC valve 7) so as to obtain the auxiliary intake air flow.

Particularly, in this embodiment, the transmission speed correcting means A501 included in the transmission ratio changing speed setting means A5 functions to correct the transmission ratio changing speed Vm according to the auxiliary intake air flow. In addition, the transmission speed correcting means A501 functions to correct the transmission ratio changing speed Vm when the auxiliary intake air flow is larger than a predetermined value. When the auxiliary intake air flow is smaller than a second predetermined value Ai2 which is larger than the first predetermined value Ai1, the transmission ratio changing speed correcting means corrects the transmission ratio changing speed Vm only when it judges that the auxiliary intake air flow will not be available by means of the intake air flow adjusting means A805, and corrects the transmission ratio changing speed Vm when the auxiliary intake air flow is larger than the second predetermined value Ai2. In any case, the means A501 sets the modified transmission ratio changing speed Vm1 as the corrected transmission speed.

Description will be made below regarding the control device for the internal combustion engine and the continuous variable transmission illustrated in FIGS. 15 and 16 in conjunction with control programs illustrated in FIGS. 19 through 21.

Figure 19:
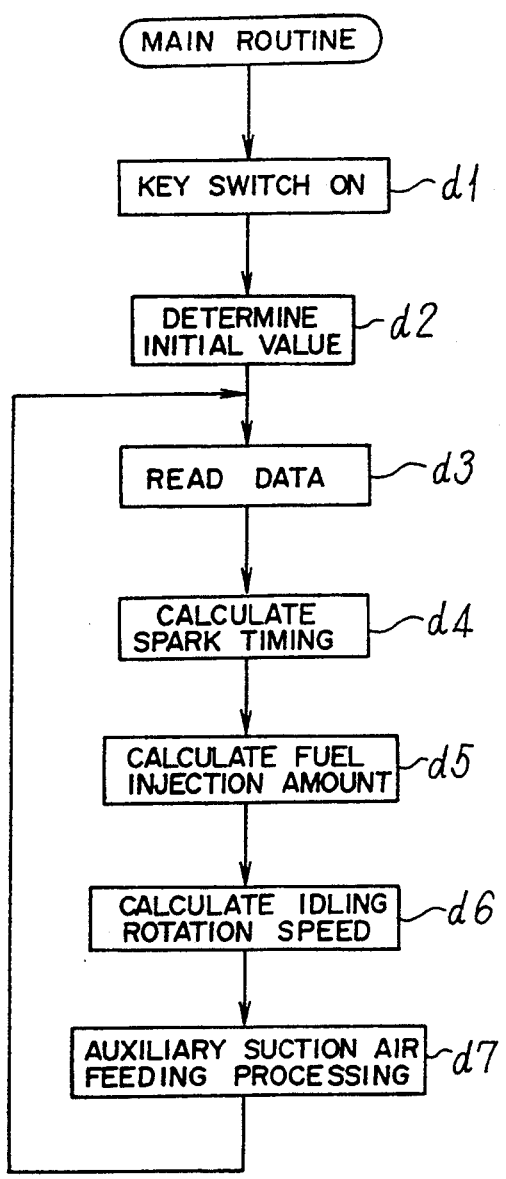
FIG. 19 is a flow chart of a main routine carried out by the ECU in the device illustrated in FIG. 15.

As the control is started, the ECU 3' carries out a main routine illustrated in FIG. 19. In this embodiment, step d1 judges the actuation of a key switch. At step d2, initial values are stored in each area where the initial values are to be stored. Then, step d3 stores data, i.e. an idling signal (ID signal), the accelerator opening $\theta a$, the throttle valve opening $\theta s$, the engine speed Ne, an intake air flow signal Ai, the water temperature wt or the like.

At step d4 and thereafter, spark timing arithmetic processing, fuel injection amount arithmetic processing, idling speed arithmetic processing and auxiliary suction air feeding processing are carried out in this order, and the control returns. In the spark timing arithmetic processing at the step d4, each spark timing advance correcting value is calculated according to the water temperature signal wt, the load in accordance with the accelerator opening $\theta a$ and fluctuation of the engine speed Ne. Such well-known processing is carried out that the reference spark timing advancing amount is modified based on this correcting value. In addition, in the fuel injection amount arithmetic processing at the step d5, each fuel injection amount correcting value is calculated according to the water temperature wt, the engine speed Ne, the intake air flow Ai, and an acceleration condition depending on the throttle valve opening $\theta s$. The reference fuel amount is calculated on the basis of the correcting value.

In the idling speed arithmetic processing at the step d6, an objective idling speed is calculated according to the water temperature wt, etc. Such well-known processing is carried out that the opening area of the bypass is controlled to be increased or decreased by means of the ISC valve 7 so as to equalize an actual engine speed to this objective idling speed.

Figure 20:
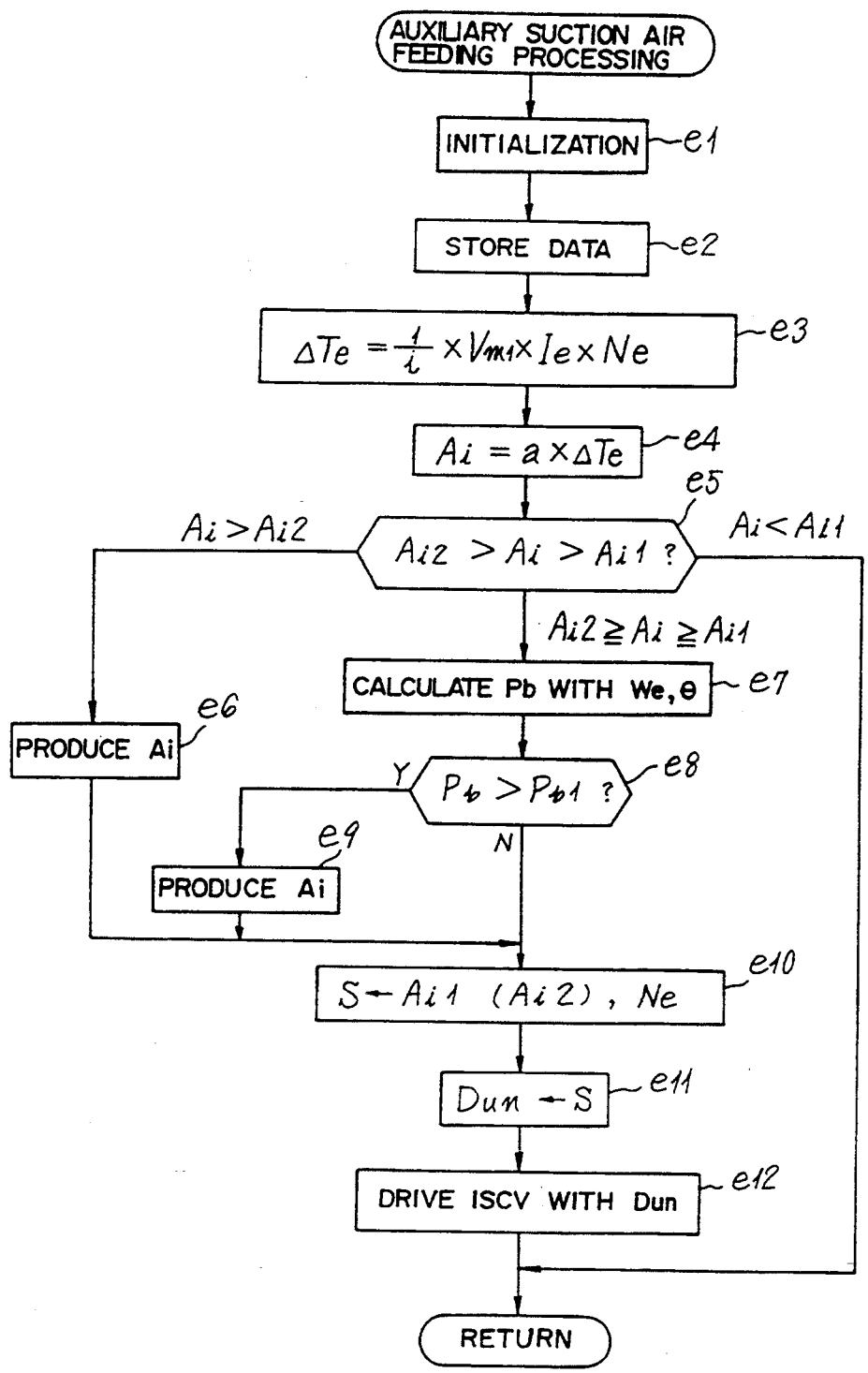
FIG. 20 is a flow chart of an auxiliary suction air feeding processing routine for use in output control carried out by the device illustrated in FIG. 15.

Step d7 carries out the auxiliary suction air feeding processing illustrated in FIG. 20. First, step e1 carries out an initialization operation. At step e2, information detected by each sensor which represents, for example, wheel speed Vw, the throttle valve opening $\theta s$, the engine speed Ne, the modified transmission ratio changing speed Vm1 supplied from the OVTECU 21, and the moment of inertia Iv of the vehicle is stored in a predetermined area. At steps e3 and e4, the auxiliary suction air feeding amount Ai is calculated, which is necessary for transmission, according to the modified transmission ratio changing speed Vm1, the wheel speed Vw, and the moment of inertia Iv of the vehicle. In this event, the transmission auxiliary torque $\Delta Te(=(1/i) \times Vm1 \times Iex\Psi)$, which is necessary for transmission, is calculated in accordance with the above mentioned equation (6)' The auxiliary suction air feeding amount Ai is calculated by multiplying this value $\Delta Te$ by a conversion constant a.

Figure 18:
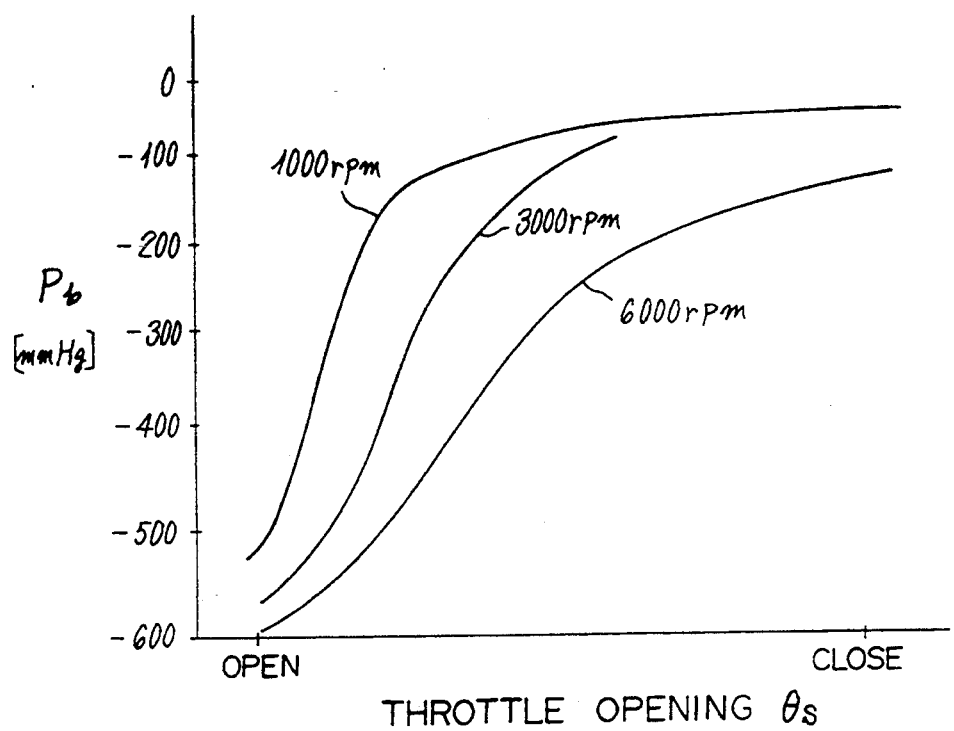
FIG. 18 is a characteristic curve of a suction air negative pressure/throttle opening converting map for use in the ECU in the device illustrated in FIG. 15.

Step e5 compares Ai with first and second threshold values Ai1 and Ai2. When Ai is smaller than the first threshold value Ai1, this step returns to the main routine due to the lack of a need for power processing. Step e7 is carried out when Ai is between the second threshold value Ai2 and the first threshold value Ai1, while step e6 is carried out when Ai is larger than the second threshold value Ai2. At the step e7, a value Pb of a suction pipe negative pressure is estimated according to the auxiliary suction air feeding amount Ai and the throttle valve opening $\theta s$ by means of the estimated negative pressure value calculating map having characteristic as illustrated in FIG. 18. This value Pb is stored in a predetermined area. Then, step e8 compares the estimated value Pb with a threshold value Pb1. When a bypass flow rate can be sufficiently increased, namely, when the estimated value Pb is smaller than the threshold value Pb1, this step directly passes to step e10, otherwise to step e9. At the step e9, the auxiliary suction air feeding amount Ai (a value between Ai2 and Ai1) is supplied to the CVTECU21. Then the step e10 is carried out.

Figure 17:
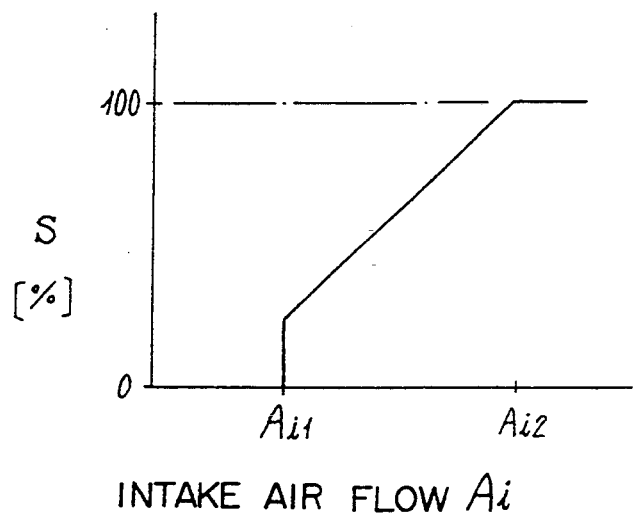
FIG. 17 is a characteristic curve of an opening area/intake air flow converting map for use in the ECU in the device illustrated in FIG. 15.

On the other hand, when the step e5 proceeds to the step e6 because the auxiliary suction air feeding amount Ai is larger than Ai2, the auxiliary suction air feeding amount Ai is supplied to the CVTECU 21. Then the step e10 is carried out. The step e10 calculates, in accordance with the calculation map illustrated in FIG. 17 (FIG. 17 only shows a diagram of a predetermined Ne), the opening area S of the bypass 101 according to the suction air amount obtained by multiplying the auxiliary suction air feeding amount Ai by the engine speed Ne to store it in a predetermined area.

At step e11, in order to obtain the opening area S, a duty ratio Dun for this value is calculated in accordance with a predetermined map (not shown) to actuate the ISC valve 7 at Dun. Then, this step returns to the main routine.

As mentioned above, the ISC valve 7 disposed in the bypass 101 is opened and closed to increase or decrease the desired auxiliary suction air feeding amount Ai, so that the engine output is enhanced by the amount corresponding to the torque which is consumed for the transmission operation of the continuously variable transmission (CVT) 35. Accordingly, transmission shock will not be caused by undertorque.

Figure 21:
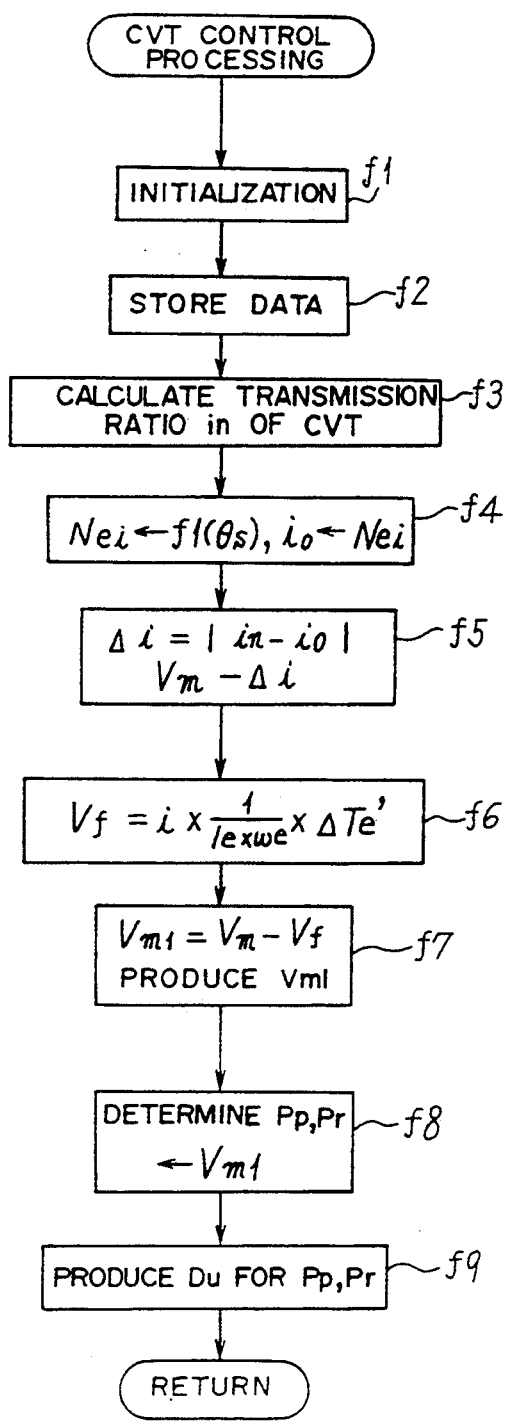
FIG. 21 is a flow chart of a CVT control processing routine carried out by the device illustrated in FIG. 15.

On the other hand, the CVTECU 21 carries out the CVT control processing routine illustrated in FIG. 21. In this event, step f1 carries out the initialization operation. Step f2 reads sensed data for each sensor such as the wheel speed Vw, the accelerator opening $\theta a$, the throttle valve opening $\theta s$, the actual transmission ratio in and the auxiliary suction air feeding amount Ai (which is larger than Ai1 and supplied form the ECU 3'). These data are stored in the predetermined area.

At step f3, the actual transmission ratio in of the continuously variable transmission 35 is calculated in accordance with the output of the engine speed sensor 40.

At step f4, an engine speed Nei corresponding to an objective transmission ratio io is calculated based on the throttle opening $\theta s$ by using the engine speed calculating map illustrated in FIG. 5 to set the objective transmission ratio io at which the engine speed Nei can be maintained. Then, at step f5, the transmission ratio deviation $\Delta i$ between the actual transmission ratio in and the objective transmission ratio io is calculated, and the transmission ratio changing speed Vm corresponding to the value $\Delta i$ is calculated to be between the maximum and minimum values Vmax and Vmin on the basis of the transmission ratio changing speed calculating map mp1 illustrated in FIG. 14.

At step f6, the transmission ratio changing speed subtraction value vf is calculated, which corresponds to the auxiliary suction air feeding amount Ai, when undertorque is caused, which has been produced at said step e6 or e9. Then, deficient transmission auxiliary torque $\Delta Te'$, which corresponds to the auxiliary suction air feeding amount Ai and the engine speed Ne, is calculated in accordance with the T-A/N map illustrated in FIG. 6. Then the transmission speed subtraction value vf for the deficient transmission auxiliary torque $\Delta Te'$ is calculated by using the equation similar to the above mentioned equation (7), namely:

$$vf(=di/dt=ix(1/(Iex\Psi e))xTe')$$

At steps f7 and f8, the transmission ratio changing speed subtraction value vf is subtracted from the transmission ratio changing speed Vm to obtain the modified transmission ratio changing speed Vm1, and the primary pressure Pp and the line pressure Pr (in particular, this embodiment is designed so as to continuously apply the constant line pressure Pr to the secondary pulley 28) is determined for the corrected transmission ratio changing speed Vm by using a map (see FIG. 12 (b)) for calculating the predetermined primary pressure.

Thereafter, step f9 proceeds to set the duty ratio Dup and Dur where the primary and line pressures Pp and Pr can be maintained. The first and the second solenoid valves 33 and 34 are duty-controlled on the basis of Dup and Dur. Thus, the actual transmission ratio in of the continuously variable transmission 35 approaches the objective transmission ratio io. Particularly, the transmission ratio changing speed subtraction value vf, which corresponds to the auxiliary suction air feeding amount Ai of the deficient transmission auxiliary torque is calculated, and the transmission ratio changing speed equivalent to this value vf is subtracted from the transmission ratio changing speed Vm. Accordingly, it is possible to prevent sudden and quick transmission, and eliminate shock.

Figure 22:
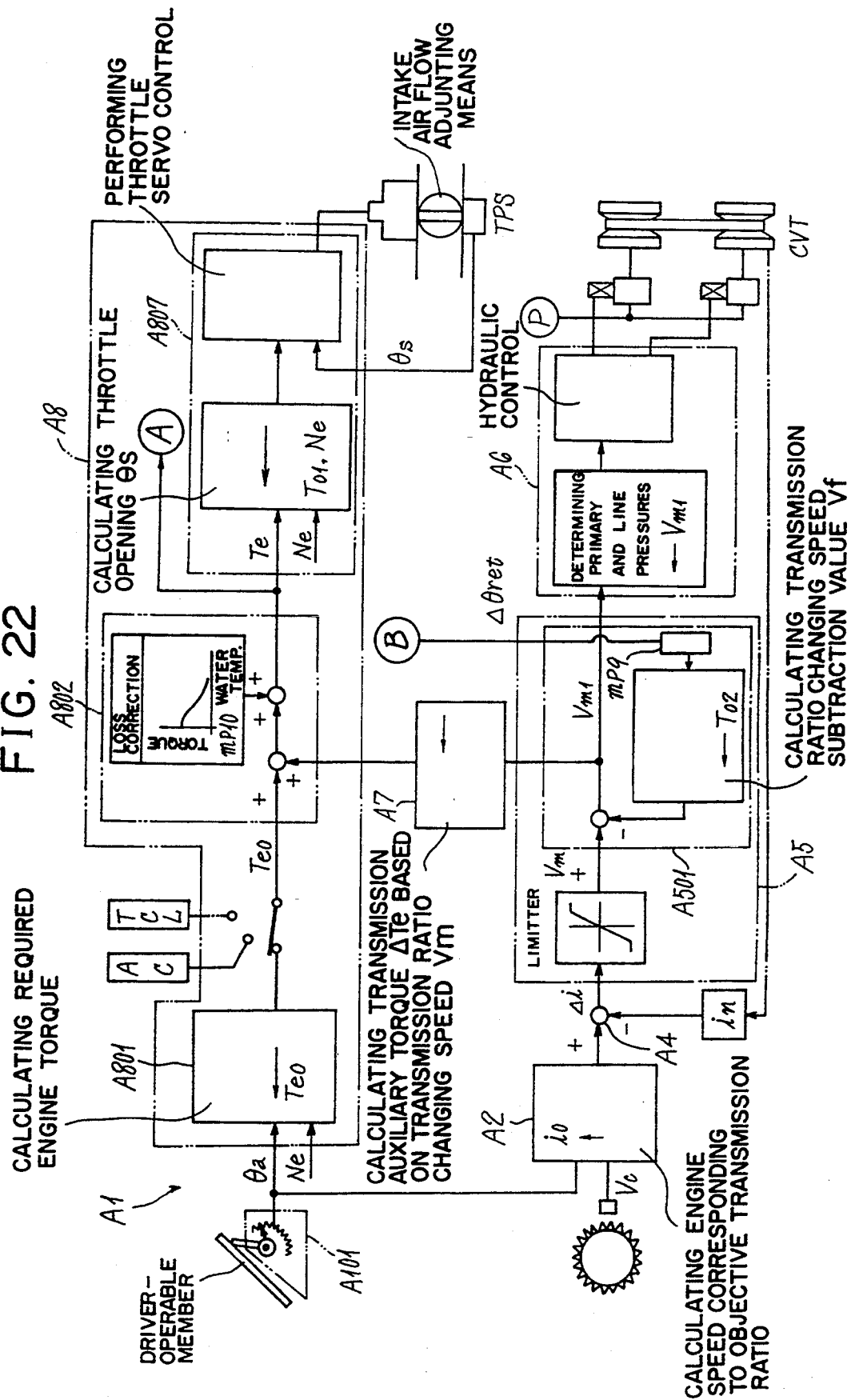
FIG. 22 is a functional block diagram of an electronic control device in the control device for an internal combustion engine and a continuously variable transmission according to another embodiment of the present invention.
Figure 23:
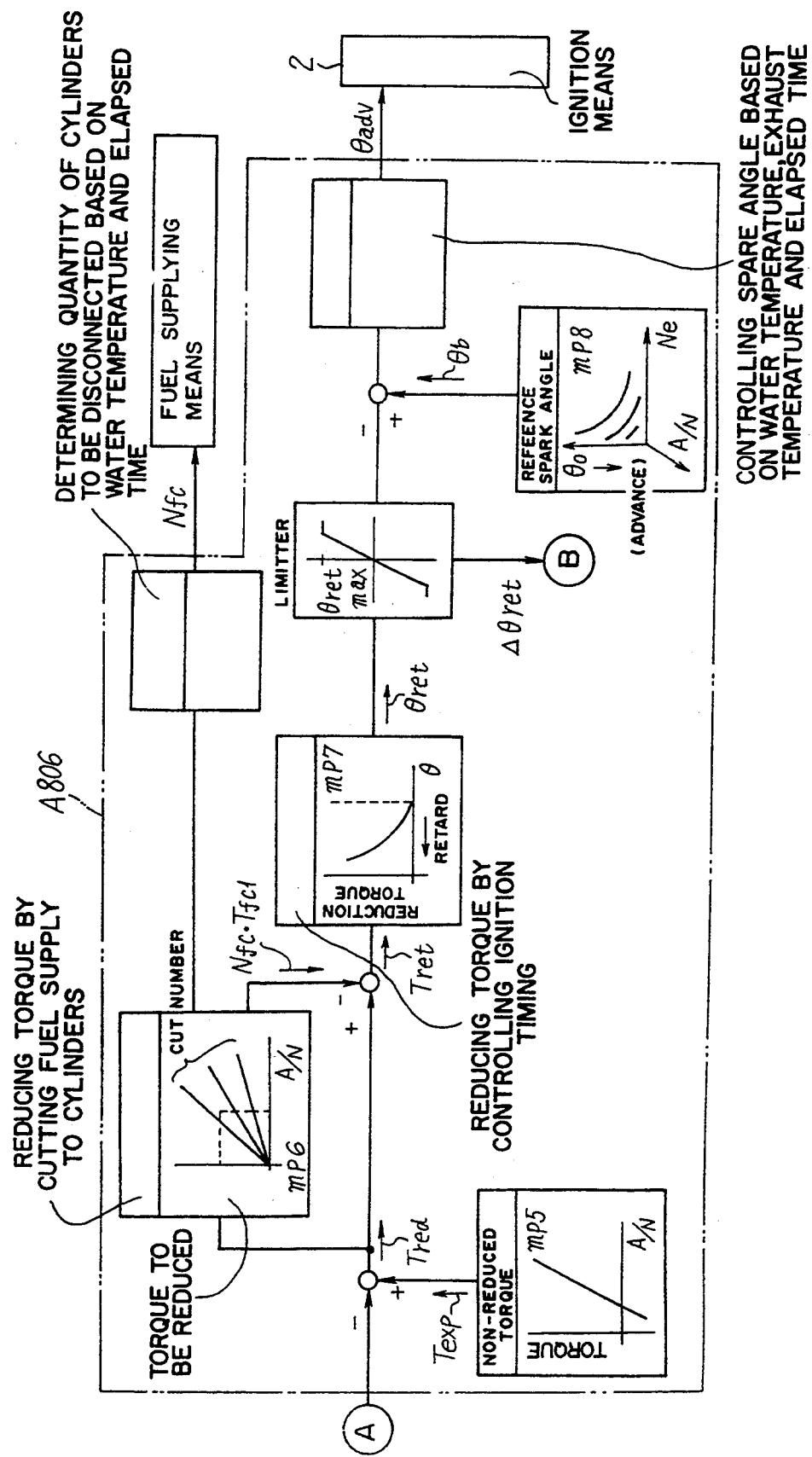
FIG. 23 is a continuation of FIG. 22.

FIGS. 22 and 23 show functional diagram of a control system in a control device for an internal combustion engine and a continuously variable transmission according to another embodiment of the present invention. The control device in this embodiment is similar to the structure to the control device of FIG. 1 except for the structure of the control unit. The similar parts are designated by like reference numerals and description of such parts will be omitted.

The engine E where the control device of this embodiment is mounted is an electronically controlled injection V type six-cylinder and four cycle engine E as in the case illustrated in FIG. 1. The plane view thereof is shown in FIG. 24.

In this engine E, devices such as the injector 1 which sprays and injects fuel and the spark plug 2 for ignition are controlled by ECU 3. Reference numeral 42 in FIG. 1 represents a well-known ignition circuit for igniting the spark plug 2.

The DBWECU 3 is connected to the actuator 11 for actuating the throttle valve 9 which serves as the intake air flow adjusting means driven independently of the operation of the acceleration pedal 10. The CVTECU 21 is connected to the hydraulic actuator 23 for hydraulically controlling the transmission ratio changing speed of the continuously variable transmission 35.

The DBWECU 3 and CVTECU 21 function as illustrated in FIGS. 22 and 23.

That is, the acceleration requirement detecting means A101 included in the driving condition detecting means A1 detects the operational amount $\theta a$ of the driver-operable member as acceleration requirement of a driver. The objective transmission ratio setting means A2 sets the objective transmission ratio io according to the operational amount $\theta a$ of the driver-operable member. The transmission ratio detecting means A3 detects the actual transmission ratio in of the continuous variable transmission 35. The transmission ratio deviation calculating means A4 calculates the deviation $\Delta i$ between the objective transmission ratio io and the actual transmission ratio in. The transmission ratio changing speed setting means A5 sets the transmission ratio changing speed Vm which is a changing rate of the transmission ratio according to the transmission ratio deviation $\Delta i$. The transmission controlling means A6 controls the continuously variable transmission 35 such that the transmission ratio changing speed Vm can be obtained. The transmission auxiliary torque calculating means A7 calculates the transmission auxiliary torque $\Delta Te$, which is consumed for the transmission operation of the continuously variable transmission 35, according to the transmission ratio changing speed Vm. First engine torque setting means A806 included in the internal combustion engine controlling means A8 sets the objective air fuel ratio and the objective spark timing $\theta adv$ transmission auxiliary torque $\Delta Te$ to control the fuel supplying means (the injector 1) and the spark plug 2.

Particularly in this embodiment, the first engine torque controlling means A806 functions to set the objective air fuel ratio smaller than the current air fuel ratio when the transmission auxiliary torque $\Delta Te$ is larger than zero, and sets the number Ncf of cylinders to be disconnected and the objective spark timing $\theta adv$ of the internal combustion engine according to the transmission auxiliary torque when the transmission auxiliary torque $\Delta Te$ is equal to or smaller than zero.

In addition, the internal combustion engine controlling means A8 acts as the required setting means A801, the objective engine torque setting means A802, and second engine torque controlling means A807. The required torque setting means A801 calculates the required torque Teo, according to the operational amount of the driver-operable member, as the torque which is necessary for the acceleration required by the driver. The objective engine torque setting means A802 sets the objective engine torque To1 according to the required torque Teo and the transmission auxiliary torque $\Delta Te$. The second engine torque controlling means A807 controls the intake air flow adjusting means (the throttle valve 9) so as to obtain the objective torque To1.

Further, the first engine torque controlling means A806 functions to set the objective air fuel ratio richer than the current air fuel ratio when the transmission auxiliary torque $\Delta Te$ is larger than zero. The means A806 determines the difference between output torque Texp of the engine which is estimated from the current intake air flow (by means of the map mp5 illustrated in FIG. 23) and the objective engine torque To1 as a target torque reduction amount Tret, and sets the number Nfc of cylinders to be disconnected and the objective spark timing $\theta adv$ (corresponding to a spark timing retarding amount) according to the required torque reduction amount when the transmission auxiliary torque is equal to or smaller than zero.

Additionally, the first engine torque controlling means A806 sets the objective spark timing θadv according to the deviation between the required torque reduction amount Tret and torque Tfc1 reduced by the disconnected cylinders.

Furthermore, the first engine torque controlling means A806 restricts the objective spark timing θadv within a predetermined allowable range.

Description will be made below regarding the control device for the internal combustion engine and the continuously variable transmission with reference to block diagrams illustrated in FIGS. 22 and 23, and the control programs illustrated in FIGS. 29 through 34.

In this embodiment, the DBWECU 3 and the CVTECU 21 are carried out in operation when the engine system E is driven by operating an ignition key which is not shown.

Figure 29:
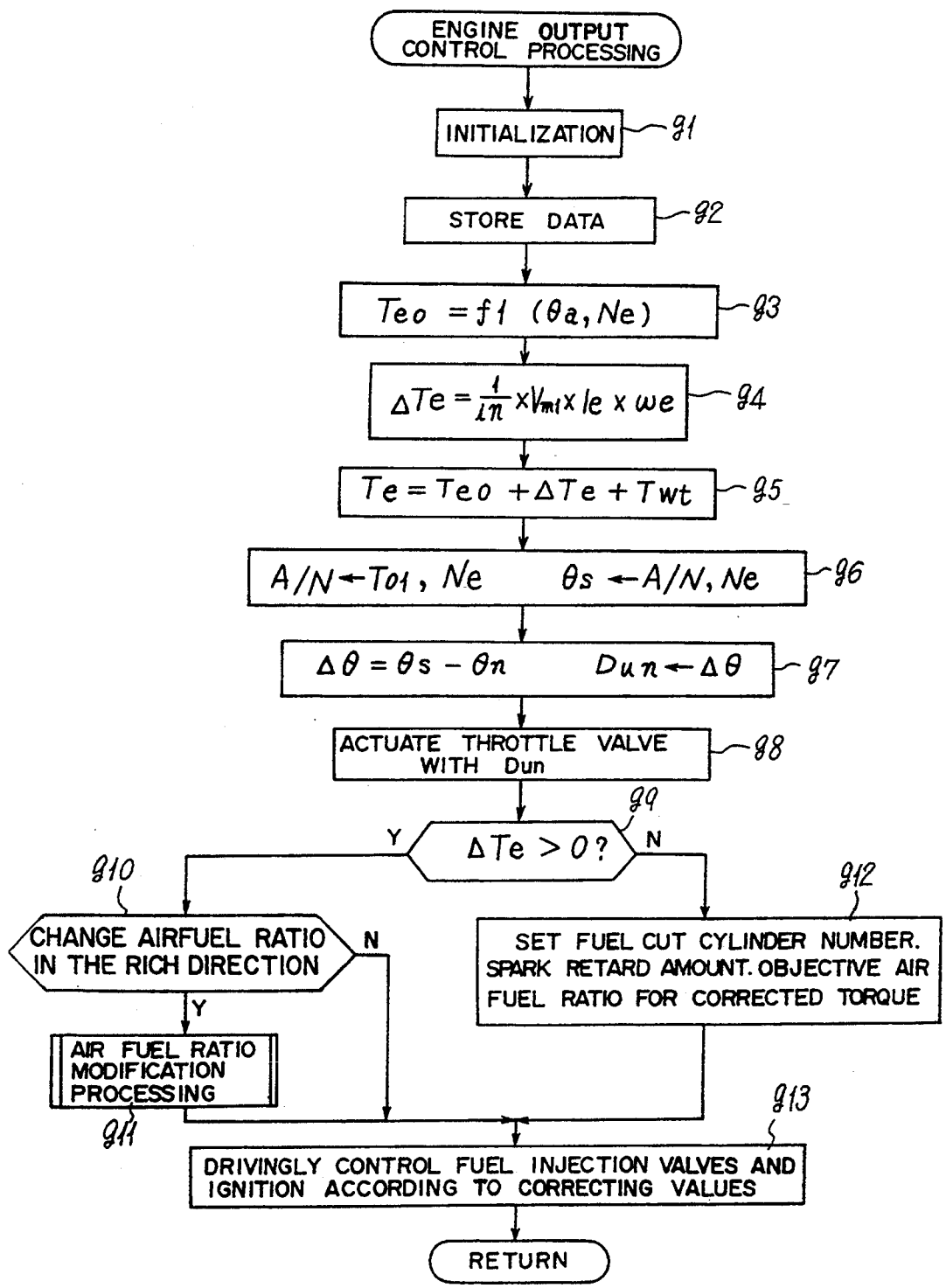
FIG. 29 is a flow chart of an engine output control processing routine for use in the device illustrated in FIGS. 22 and 23.

As the control is started, the DBWECU 3 carries out a main routine similar to that illustrated in FIG. 10. The engine output control processing illustrated in FIG. 29 is carried out when the routine proceeds to the engine output control processing at the step c11.

At the beginning of the control, the initialization operation is carried out at step g1. At step g2, the data such as the accelerator opening θa, the engine speed Ne, and the transmission ratio changing speed Vm1 supplied from the CVTECU 21 are stored in the predetermined area. Step g3 calculates the required engine torque Teo with respect to the throttle valve opening θa and the engine speed Ne by means of the intake air flow/torque calculating map illustrated in FIG. 6 and the throttle valve (accelerator) opening/intake air flow calculating map illustrated in FIG. 7. At step g4, ΔTe which is necessary for the transmission operation is calculated based on the transmission ratio changing speed Vm1 according to the above mentioned equation (6)', namely:

$$\Delta Te = (1/i) \times Vm1 \times Iex \times Ne \qquad (6)'$$

At step g5, the required engine torque Teo is added to the transmission auxiliary torque ΔTe, and loss torque Twt depending on the water temperature wt is added thereto to calculate the objective engine torque Te.

In order to achieve the objective engine torque Te, step g6 controls the opening of the throttle valve 9. For this purpose, the intake air flow A/N is calculated with respect to the objective engine torque Te and the current engine speed Ne (see the map illustrated in FIG. 6) and the throttle valve opening θn is calculated according to the intake air flow A/N and the engine speed Ne (see the map illustrated in FIG. 7). Then, step g7 calculates deviation Δθ by subtracting θn from the current throttle valve opening θs. The duty ratio Dun, to eliminate the deviation Δθ, is calculated. The servo motor 11 is actuated by this duty ratio Dun to correct the throttle valve 9 to the opening θn.

Step g9 judges whether or not the engine output torque correcting amount ΔTe is positive. Step g10 is carried out when ΔTe is positive and the torque should be increased while step g12 is carried out when ΔTe is negative and the torque should be decreased.

Figure 32:
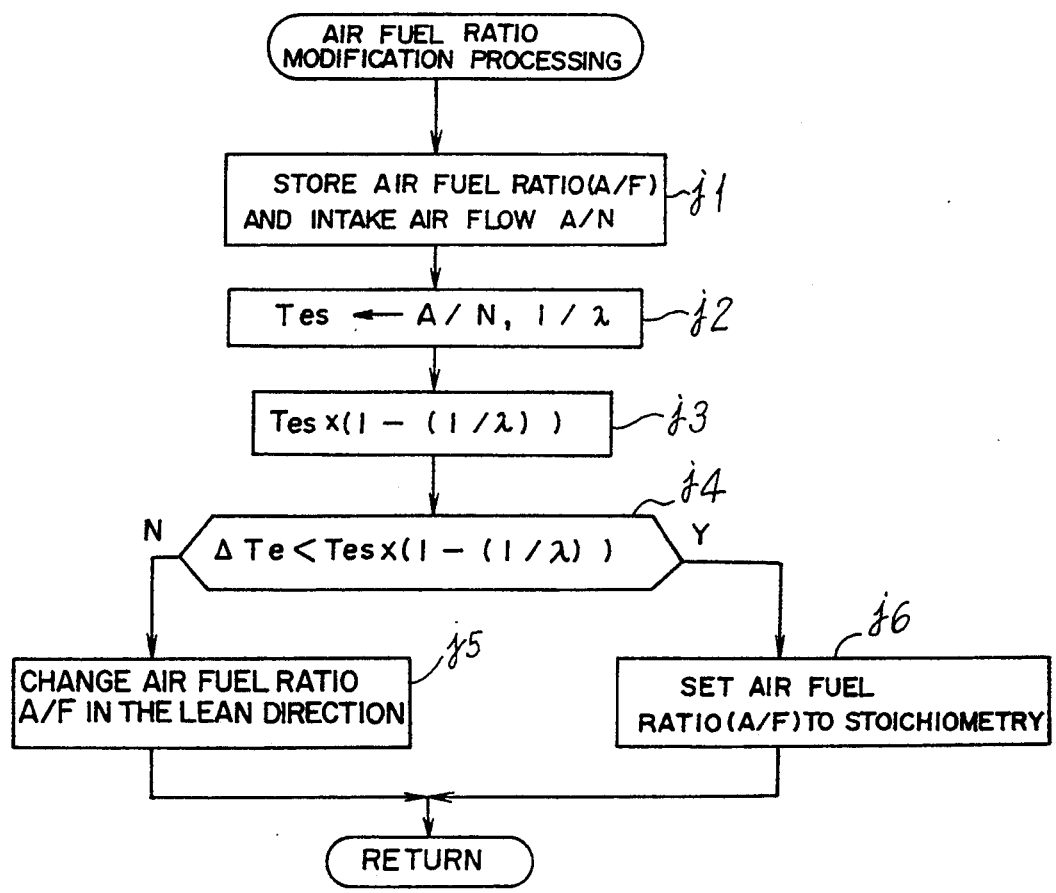
FIG. 32 is a flow chart of an air fuel ratio change processing routine for use in the device illustrated in FIGS. 22 and 23.

The step g10 judges whether or not the air fuel ratio can be raised, namely, whether or not the current air fuel ratio is in the lean side. If the current air fuel ratio is at the stoichiometric ratio, step g10 passes to g13. If the current air fuel ratio is large (lean) and can be made small, step g11 follows. The step g11 changes the air fuel ratio as illustrated in FIG. 32.

Figure 28:
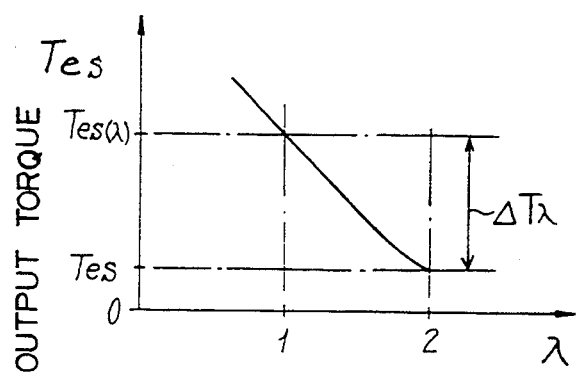
FIG. 28 is a characteristic curve of a torque/excess air ratio converting map for use in the device illustrated in FIGS. 22 and 23.

In this event, the step j1 stores the current engine speed Ne, the air fuel ratio A/F, excess air ratio λ and the intake air flow A/N. Then, at steps j2 and j3, objective torque Tes corresponding to the stoichiometric ratio is calculated in accordance with these data by means of the torque T/intake air flow A/N calculating map illustrated in FIG. 6. A deviation ΔTλ between the objective torque Tes and the actual torque (=Tes×(1/λ), the relation therebetween is shown in FIG. 28, namely, the increase of controllable torque Tes×(1−(1/λ)) is calculated. Step j4 judges whether or not the increase amount of the controllable torque Tes×(1−(1/λ)) is larger than the transmission auxiliary torque ΔTe. When Tes is large, the air fuel ratio (increase of output is allowable) at step j6, namely, the air fuel ratio correcting coefficient KAF is set to the stoichiometric ratio. Then this step goes back to the step g13 of the engine output control processing. When Tes is small, the air fuel ratio is kept large at step j5. Then, this step goes back to the step g13 of the engine output control processing.

When the judgment at the step g9 of the engine output control processing represents that the transmission auxiliary torque ΔTe is negative and the torque should be decreased, step g12 is carried out. In this step, the number of fuel cut cylinders Nfc and a spark timing retarding amount Qndv are set on the basis of the transmission auxiliary torque ΔTe.

Figure 31:
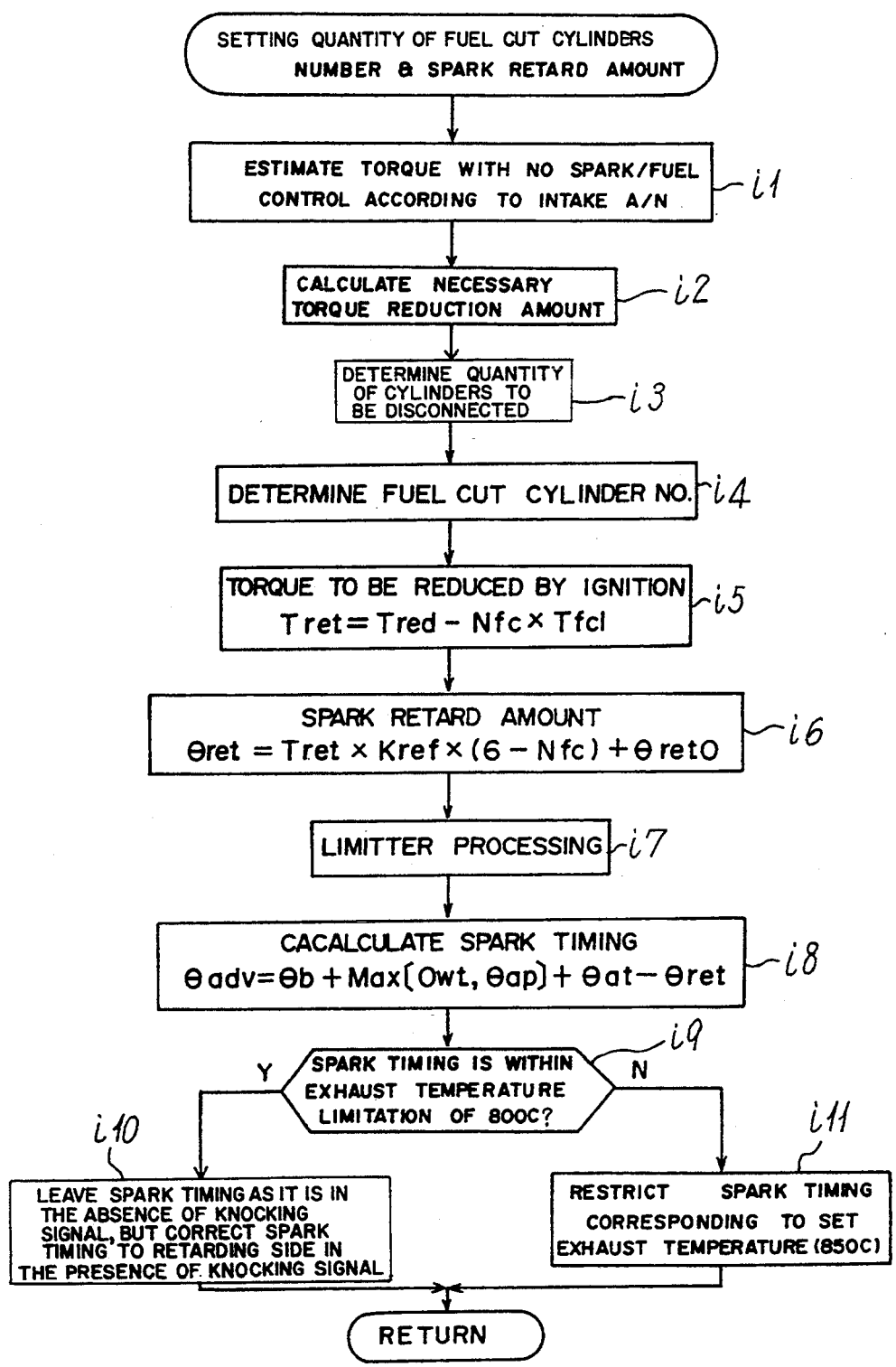
FIG. 31 is a flow chart of a processing routine for setting the number of cylinders where the fuel is cut off for use in the device illustrated in FIGS. 22 and 23.

As illustrated in FIG. 31, step 11 calculates expected torque Texp, for the case where the torque is not reduced, according to the intake air flow A/N by means of the following equation (9).

$$Texp = a \times Abn - b \qquad (9)$$

where Abn represents the intake air flow (A/N%), a and b represent coefficients (which are set in accordance with the engine speed and are read out of predetermined maps). One such map is illustrated as a non-reduced torque map mp5 in FIG. 23.

In addition, a necessary torque reduction amount Tred is calculated according to an equation (10) where the objective engine torque Te is subtracted from the expected torque Texp at step i2. The number of fuel cut cylinders Nfc is calculated according to an equation (11) where the necessary torque reduction amount Tred is divided by a torque reduction amount Tfc1 per cylinder. The torque reduction amount Tfc1 per cylinder is calculated by using an equation (12) below.

$$Tred = Texp - Te \qquad (10)$$

$$Nfc = Tred/Tfc1 \qquad (11)$$

Nfc is determined as an integer by means of the map as illustrated in FIG. 25(a).

$$Tfc = a \times Abn/6 \qquad (12)$$

Thereafter, when step i4 is carried out, the cylinders to be disconnected are determined according to the number of fuel cut cylinders by means of the map as illustrated in FIG. 25(a) and FIG. 25(b).

In both maps of FIGS. 25(a) and 25(b), the cylinders to be disconnected are designated as described above in consideration with rotation balance and cooling effect or the like, according to the structure and characteristics of the engine E (in this embodiment, V type six cylinder engine as in FIG. 24).

When the cylinders to be disconnected are determined, step i5 is carried out. At the step i5, an equation (13) below is calculated where the torque Tret to be reduced by retarding the ignition timing is obtained by subtracting the torque, which is reduced by the cylinders to be disconnected from the necessary torque reduction amount Tred. In addition step i6 calculates an equation (14) below where the necessary amount $\theta$ret for retarding the spark timing is obtained by multiplying the torque Tret (torque reduced by retarding the spark timing) by retard gain Kret and the number of the active cylinders (6−Nfc) and then adding ineffective retard amount $\theta$reto thereto. Further, following the limitter processing at step i7, step i8 calculates an equation (15) below for calculating the spark timing $\theta$adv by summing the spark timing correcting values ($\theta$wt, $\theta$ap and $\theta$at) depending on the water temperature, atmospheric pressure and intake air temperature. Then, the necessary retarding amount $\theta$ret is subtracted therefrom.

$$Tret = Tret - Nfc \times Tfc1 \quad (13)$$

$$\theta ret = Tret \times Kret \times (6-Nfc) + \theta reto \quad (14)$$

$$\theta adv = \theta b + Max[\theta wt, \theta ap] + \theta at - \theta ret \quad (15)$$

where Tfc1 represents the torque reduction amount per cylinder, Kret represents the retard gain (calculated by a map prepared beforehand according to A/N and the engine speed Ne), $\theta$reto represents the invalid retarding amount (calculated by a map prepared beforehand according to A/N and the engine speed Ne), $\theta$b represents a reference spark timing, and $\theta$wt, $\theta$ap and $\theta$at represent spark timing correcting values depending on the water temperature wt, the atmospheric pressure ap and the intake air temperature at, respectively. These are calculated in a usual routine.

At the step i7, the necessary retard amount $\theta$ret is processed by means of the limitter. If there is deficient ignition retarding amount $\Delta\theta$ret over the allowable range, the value is substituted by clipping by a predetermined value $\pm\theta$retmax which is the maximum value in the allowable range to transmit the deficient spark retard amount $\Delta\theta$ret to the CVTECU 21 (step i7).

Then, step i9 judges whether or note the spark timing exceeds maximum retard amount at a first set exhaust temperature (in this embodiment, this is set at 850° C). When the spark timing $\theta$adv calculated at step i8 is in an advancing side it is used without change. If the spark timing $\theta$adv is in the advancing side but there is a knocking signal, the spark timing $\theta$adv is corrected to the retarding side so as to clear the knocking (step i10). On the other hand, when the present spark timing $\theta$adv exceeds the maximum retard amount, step i11 folows where the present spark timing $\theta$adv is corrected to the maximum retard amount for the first set exhaust temperature (850° C). The steps i10 and i11 pass to the step g13 of the engine output control routine.

In step g13, the fuel injection valve 1 and the ignition circuit 42 are drivingly controlled in accordance with each correcting value which has already been calculated.

Figure 33:
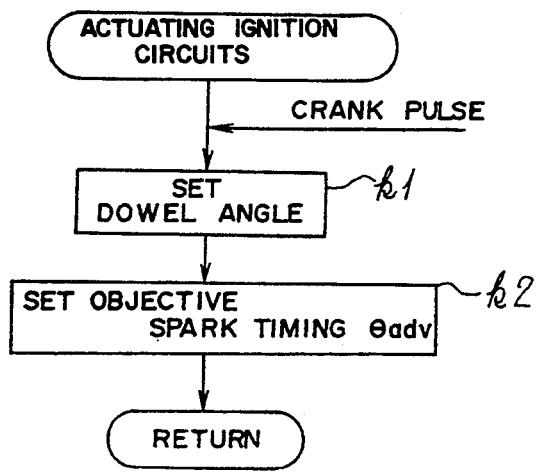
FIG. 33 is a flow chart relating to setting a dowel angle counter and a spark timing counter.
Figure 34:
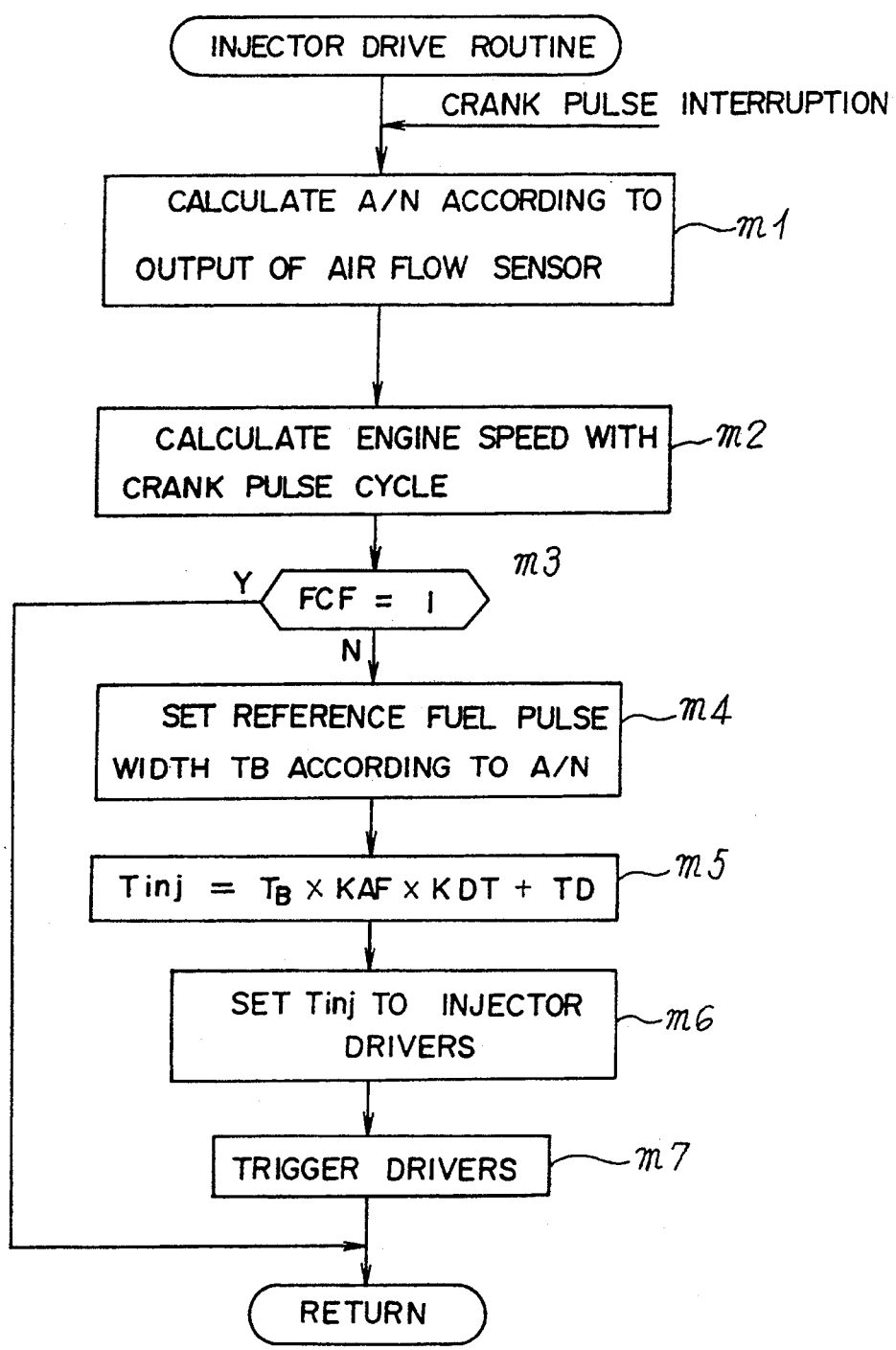
FIG. 34 is a flow chart of an injector actuating routine for use in the device illustrated in FIGS. 22 and 23.
Figure 36:
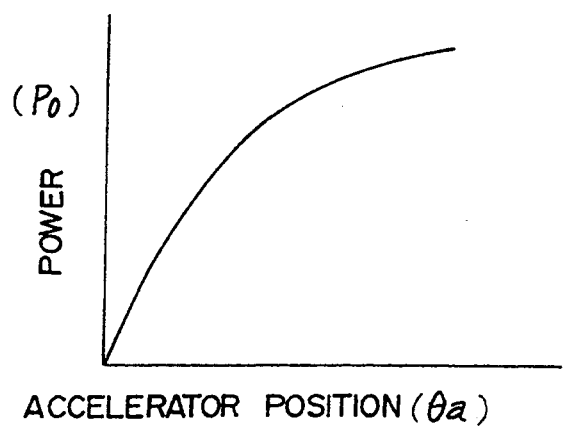
FIG. 36 is a characteristic curve of a required output calculating map for use in the device illustrated in FIG. 35.

During the ECU main routine, the injector driving routine illustrated in FIG. 34 and the spark driving routine illustrated in FIG. 33 are carried out.

The injector actuating routine carries out steps m1 and m2 each time a crank pulse is applied, so that the intake air flow A/N and the engine speed Ne are stored. When the fuel cut flag FCF represents 1, control returns to the main routine. On the other hand, if FCF represents 0, the control passes to step m4. In this step, reference fuel pulse width $T_B$ is determined to calculate a main pulse width data $T_{inj} = T_B \times KAF \times KDT + TD$. Then step m6 is carried out.

In step m6, Tinj is set only for injector drivers of the active cylinders. These injector drivers are triggered to inject fuel via the injection valve 1 and this step is returned. This processing results in reduction of the torque corresponding to the number of fuel cut cylinders Nfc.

As illustrated in FIG. 33, when step k1 is carried out due to the interruption of the crank pulse, a dowel angle, which corresponds to a period of time to apply the primary current, and is equivalent to a crank angle width, is set in a dowel angle counter. At step k2, the objective spark timing $\theta$adv is set in a spark timing counter for producing a spark signal at an objective spark angle.

Each time the present number of crank pulses is counted, the ignition circuit 42 is operated to activate the spark plug 2. In this ignition processing, the torque Tret to be reduced is quickly reduced by retarding the spark timing $\theta$adv by the necessary retarding amount $\theta$ret.

Figure 30:
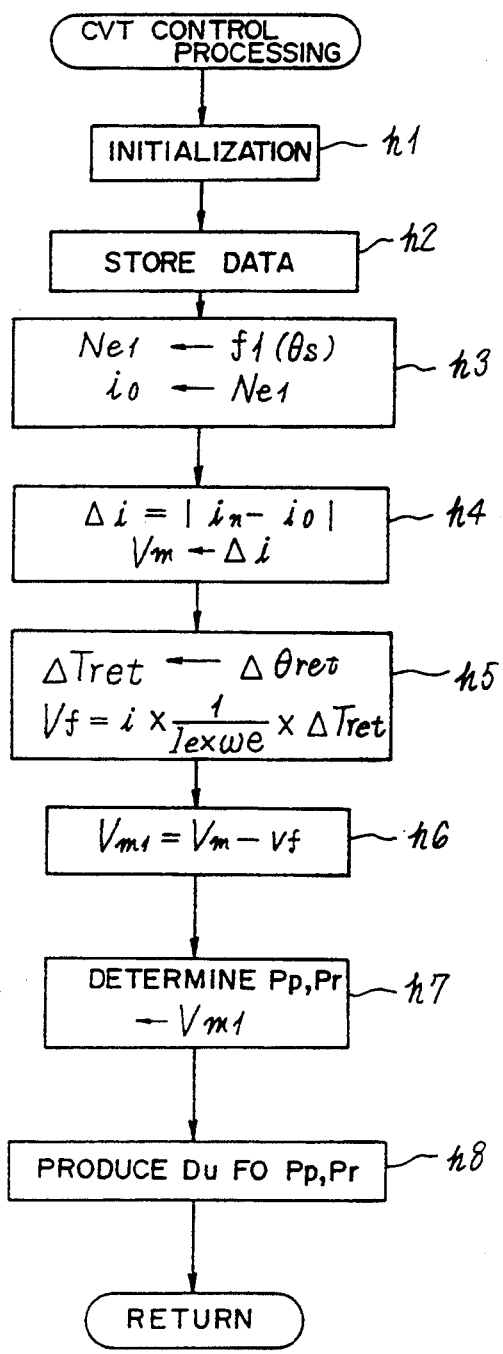
FIG. 30 is a flow chart of a CVT control processing routine for use in the device illustrated in FIGS. 22 and 23.

The CVTECU 21 carries out the CVT control processing routine illustrated in FIG. 30. Step h1 carries out initialization operation. Step h2 reads the data such as the vehicle speed Vc, the throttle valve opening $\theta$s and the actual transmission ratio in. The data are stored in the predetermined area.

At step h3, an engine speed Ne1 to objective transmission ratio io is calculated by the map illustrated in FIG. 5 to set the objective transmission ratio io at which the engine speed Ne1 can be maintained. Then, at step h4, the transmission ratio deviation $\Delta i$ between the actual transmission ratio in and the objective transmission ratio io is calculated. The transmission ratio changing speed Vm corresponding to $\Delta i$ is calculated to be between the maximum and minimum values Vmax and Vmin according to the transmission ratio changing speed calculating map mp1 illustrated in FIG. 14.

Figure 27:
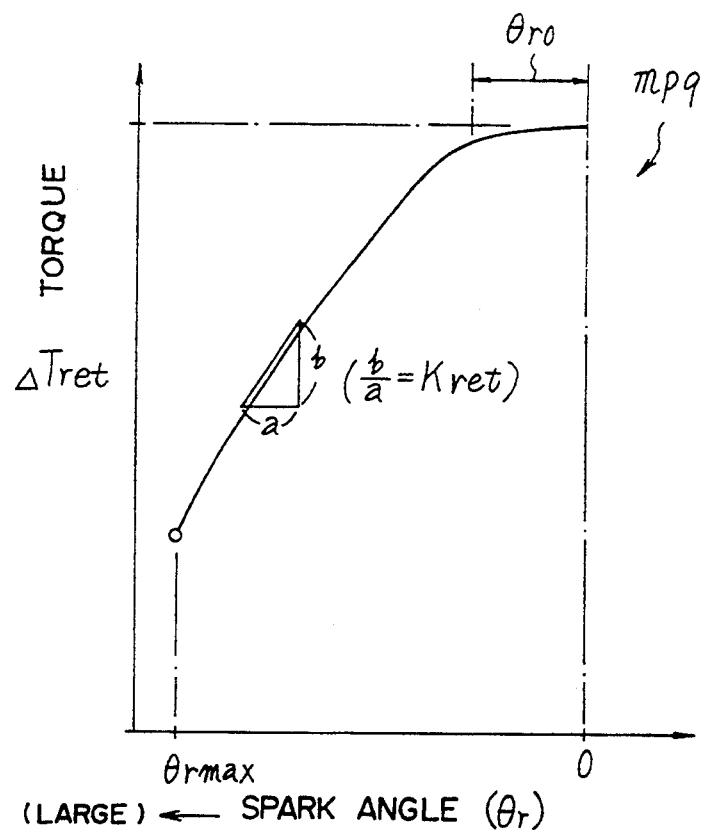
FIG. 27 is a characteristic curve of a torque/retard amount converting map for use in the device illustrated in FIGS. 22 and 23.

Step h5 calculates the deficient spark retard amount $\Delta Tret$ (=Kret ($\theta r - \theta ro$)) according to the retard-/torque reduction converting map mp9 illustrated in FIG. 27. Then, the transmission ratio changing speed subtraction value vf corresponding to the undertorque $\Delta Tret$ is calculated as the transmission ratio changing speed subtraction value Vf (=di/dt=ix1/(Iex$\Psi$e))x$\Delta$-Tret) by using the above mentioned equation (7).

In addition, the transmission ratio changing speed subtraction value vf is subtracted from the transmission ratio changing speed Vm to obtain the corrected transmission ratio changing speed Vm1. Further, the primary pressure Pp and the line pressure Pr (in particular, this embodiment is designed so as to continuously apply the constant line pressure Pr to the secondary pulley 28) is determined by using the map (see FIG. 12(b)) for calculating the predetermined primary pressure according to the corrected transmission ratio changing speed Vm1.

Thereafter, step h8 is carried out where the duty ratios Dup and Dur are set to maintain the primary and line pressure Pp and Pr. The first and the second solenoid valves 33 and 34 are duty-controlled with respect to Dup and Dur. Thus, the actual transmission ratio in of the continuously variably transmission 35 approaches the objective transmission ratio io. In addition, the output is maintained for an adequate air fuel ratio, and slip of the steel belt 27 can be prevented by appropriately disconnecting cylinders so that generation of excessive output can be hindered. The transmission ratio changing speed corresponding to the deficient spark retard amount $\Delta\theta$ret is calculated, resulting in elimination of transmission shock.

Figure 35:
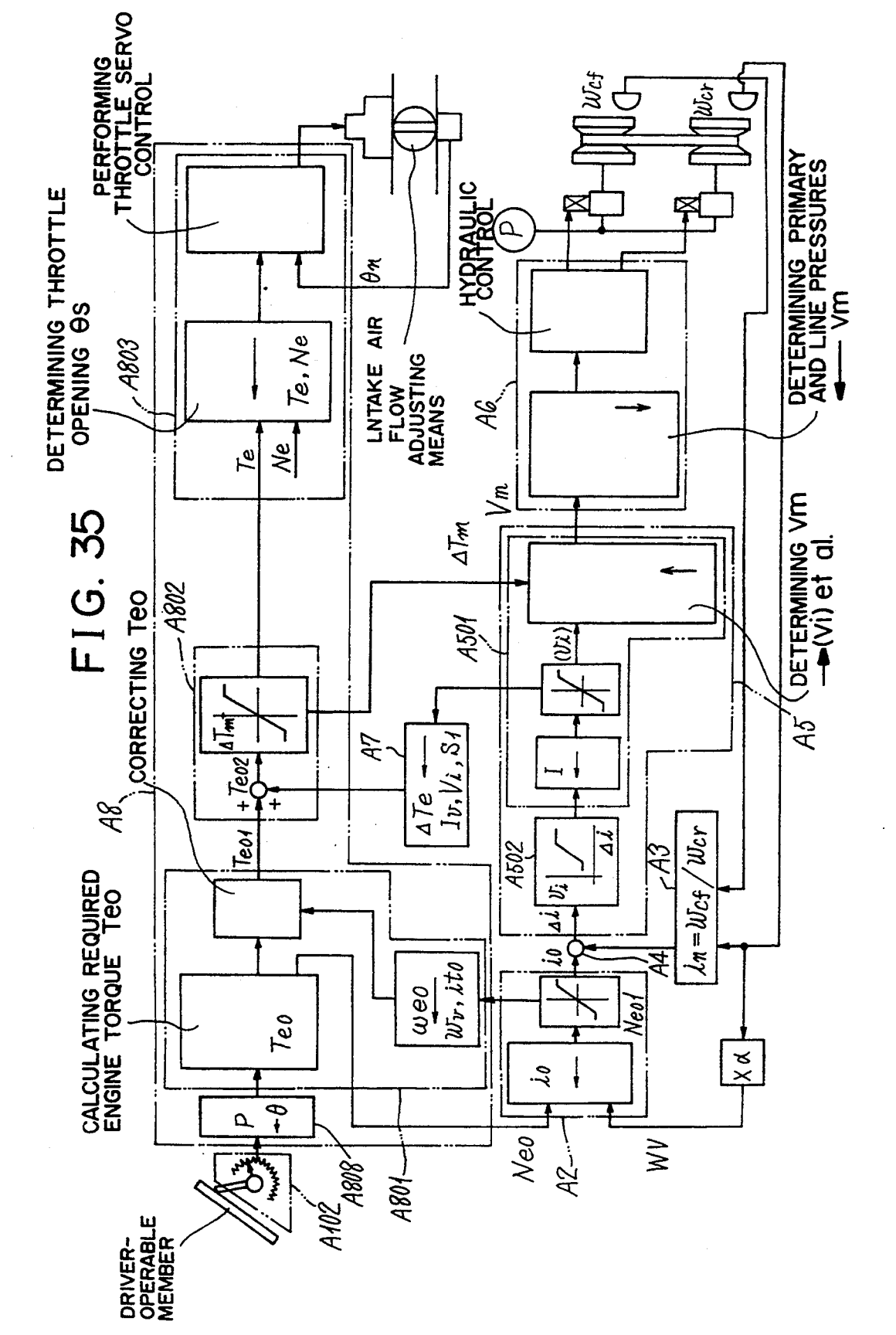

FIG. 35 shows functional block diagram of a control device in a control unit for an internal combustion engine and a continuously variable transmission according to another embodiment of the present invention. The control device in this embodiment is similar in structure to the control device in FIG. 1 except for the structure of the control unit. Accordingly, FIG. 1 is also used to describe the control device according to this embodiment. The like parts are designated by like reference numerals and description of such parts will be omitted.

The engine E where the control device of this embodiment is mounted is an electronically controlled injection four cycle engine E as illustrated in FIG. 1.

In this engine E, devices such as the injector 1 by which fuel is sprayed and injected and the spark plug 2 for ignition are controlled by the DBWECU 3 which serves as the electronic control means.

The DBWECU 3 is connected to the actuator 11 for actuating the throttle valve 9. The CVTECU 21 is connected to the hydraulic actuator for hydraulic-controlling the transmission ratio changing speed of the continuously variable transmission 35.

The DBWECU 3 and CVTECU 21 function as illustrated in FIG. 35.

The operational amount detecting means A102 included in the driving condition detecting means A1 detects the operational amount $\theta$a of the driver-operable member. The transmission ratio detecting means A3 detects the actual transmission ratio in of the continuously variable transmission 35. The transmission ratio deviation calculating means A4 calculates the deviation $\Delta$i between the objective transmission ratio io and the actual transmission ratio in. The transmission ratio changing speed setting means A5 sets the transmission ratio changing speed Vm which is a changing rate of the transmission ratio according to the transmission ratio deviation $\Delta$i. The transmission controlling means A6 controls the continuously variable transmission 35 such that the transmission ratio changing speed Vm can be achieved. The transmission auxiliary torque calculating means A7 calculates the transmission auxiliary torque $\Delta$Te, which is consumed during the transmission operation of the continuously variable transmission 35, according to the transmission ratio changing speed Vm.

The internal combustion engine controlling means A8 comprises required output detecting means A808, required torque setting means A801, objective engine torque setting means A802 and engine torque controlling means A803. The required output detecting means A808 obtains required output Po information of a driver according to the operational amount $\theta$a of the driver-operable member. The required torque setting means A801 sets the required torque Teo and the objective engine speed Neo which correspond to the required power Po information. The objective torque setting means A802 sets the objective engine torque Te according to the required torque Teo and the transmission auxiliary torque $\Delta$Te. The engine torque controlling means A803 controls the intake air flow adjusting means (the throttle valve 9) so as to obtain the objective engine torque Te.

In addition, the objective transmission ratio setting means A2 sets the objective transmission ratio io according to the objective engine speed Ne.

Particularly in this embodiment, the objective transmission ratio setting means A2 restricts the objective transmission ratio io within the allowable range when the objective transmission ratio io is found outside the allowable range. Further, the objective transmission ratio setting means sets a modified engine speed Neo1 as an objective engine speed so as to keep the objective transmission ratio io within the allowable range, when the objective transmission ratio io is not in the allowable range.

Moreover, the required torque setting means A801 sets the modified required torque Teo1 as required torque corresponding to the required output Po information and the corrected engine speed Neo1.

The objective engine torque setting means A802 restricts the objective engine torque within the allowable torque range when the objective engine torque Teo2, obtained according to the required torque Teo and the transmission auxiliary torque $\Delta$Te, is not in a predetermined allowable torque range.

In addition, the temporary transmission ratio changing speed setting means A5 comprises temporary transmission ratio changing speed setting means A502 and the transmission ratio changing speed correcting means A501. The temporary transmission ratio changing speed setting means A502 sets temporary transmission ratio changing speed vi according to the transmission ratio deviation $\Delta$i. The transmission ratio changing speed correcting means A501 determines the transmission ratio changing speed Vm by calculating transmission ratio changing speed subtracted torque, i.e. undertorque $\Delta$Tm when the objective engine torque Teo2 is restricted within the predetermined allowable range by the objective engine torque calculating means and by correcting the temporary transmission ratio changing speed vi according to the transmission ratio changing speed subtracted torque.

Further, the transmission ratio changing speed correcting means calculates, according to the temporary transmission ratio changing speed, a transmission shock index which represents a degree of transmission shock, and determines the transmission ratio changing speed by correcting the temporary transmission ratio changing speed according to the transmission ratio changing speed subtracted torque when the transmission shock index is not in a predetermined allowable range. Conversely, the foregoing means determines the temporary transmission ratio changing speed vi as the transmission ratio changing speed Vm when the transmission shock index is in the predetermined allowable range.

Figure 38:
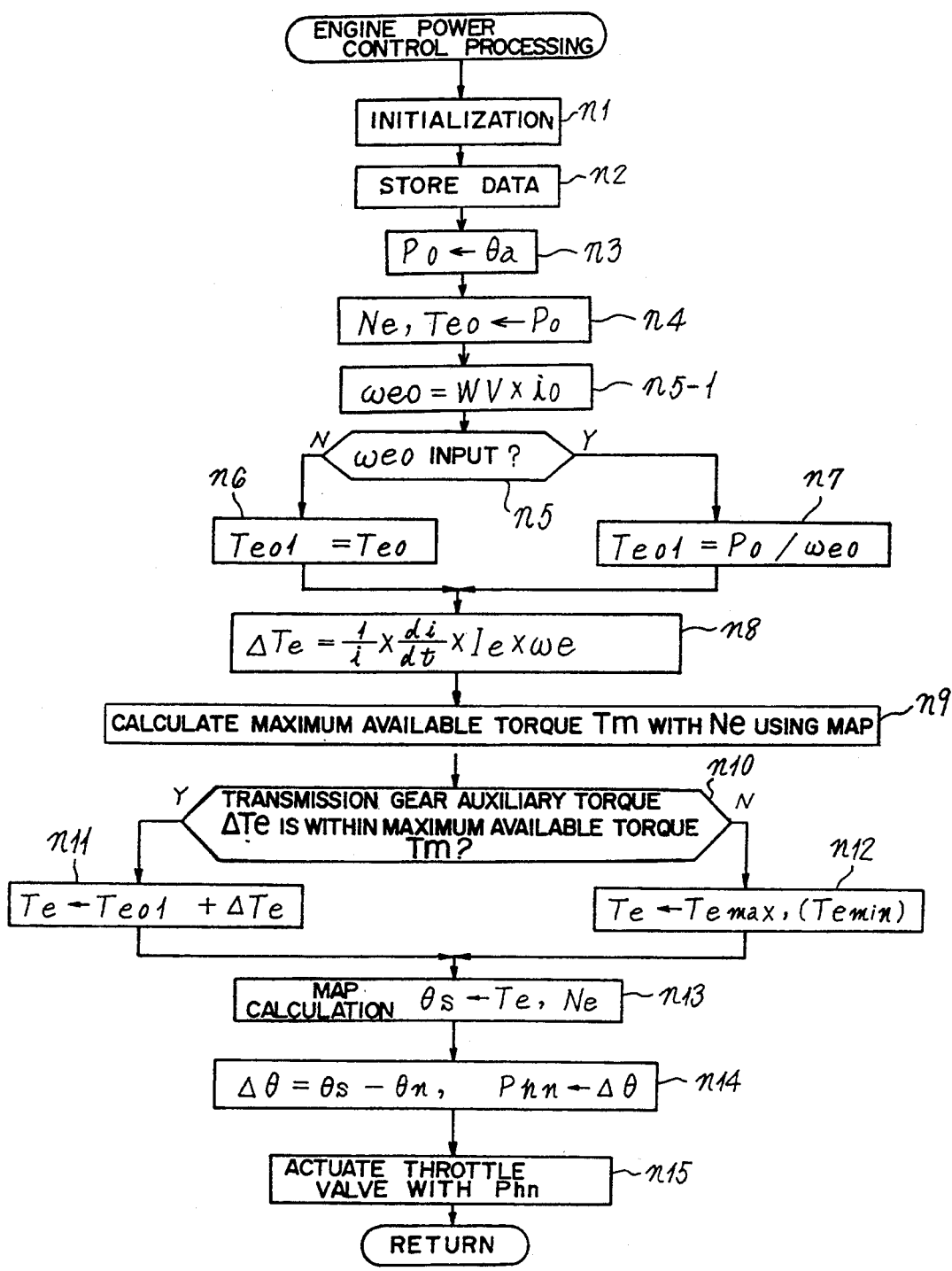
FIG. 38 is a flow chart of an engine output control processing routine for use in the device illustrated in FIG. 35.

Description will be made below regarding the control device for the internal combustion engine and the continuously variable transmission of which a functional block diagram is illustrated in FIG. 35 in conjunction with the control programs illustrated in FIG. 38 through 40.

In this embodiment, the DBWECU 3 and CVTECU 21 perform their control operation when the engine system E is driven by operating an ignition key which is not shown.

As the control is started, the DBWECU 3 carries out a main routine similar to that illustrated in FIG. 10. The engine output control processing illustrated in FIG. 38 is carried out when the main routine reaches the step c11.

Figure 37:
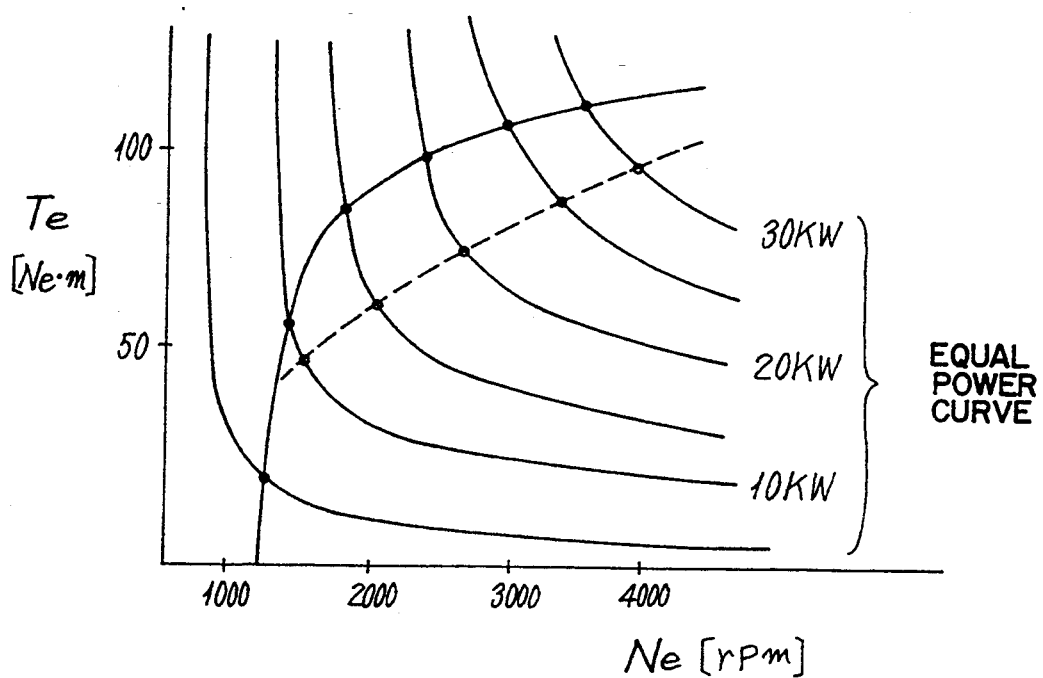
FIG. 37 is a characteristic curve of a output/torque and engine speed converting map for use in the device illustrated in FIG. 35.

In this embodiment, steps n1 and n2 carry out initialization operation to read and store, in the predetermined area, data such as the accelerator opening $\theta a$, the engine speed Ne, corrected engine speed $\Psi eo$ supplied from the CVTECU21, the transmission auxiliary torque $\Delta Te$, and the transmission ratio changing speed Vm. Step n3 calculates the required power Po corresponding to the accelerator opening $\theta a$ in accordance with the required power Po calculating map illustrated in FIG. 39, and stores Pc in a predetermined area. Subsequently, the objective engine speed Neo and the required engine torque Teo for the required power Po are calculated in accordance with the Neo/Teo calculating map illustrated in FIG. 37. Step n5-1 calculates the corrected engine speed $\omega eo$ by multiplying the objective transmission ratio io by the vehicle speed wv and renews old $\omega eo$. Step n5 judges whether or not the vehicle speed wv and the corrected engine speed $\Psi eo$ have been input (whether or not they exceed corrected levels). When wv and $\omega eo$ have been input, step n7 is carried out to calculate the corrected required torque Teo1 (=Po/$\Psi eo$). When the corrected engine speed $\Psi eo$ has not been input, the required torque Teo is determined as the corrected required torque Teo1 at step n6. Subsequently, the control passes to step n8. In this step, signals are stored which indicate the latest moment of inertia Ie of the vehicle body, the transmission ratio changing speed Vm, and the transmission ratio io. The transmission auxiliary torque $\Delta Te$, which is necessary for the transmission operation is calculated in accordance with the above mentioned equation (6), namely, $$\Delta Te = (1/i) \times (di/dt) \times Iex \Psi e \qquad (6)'$$

Figure 6:
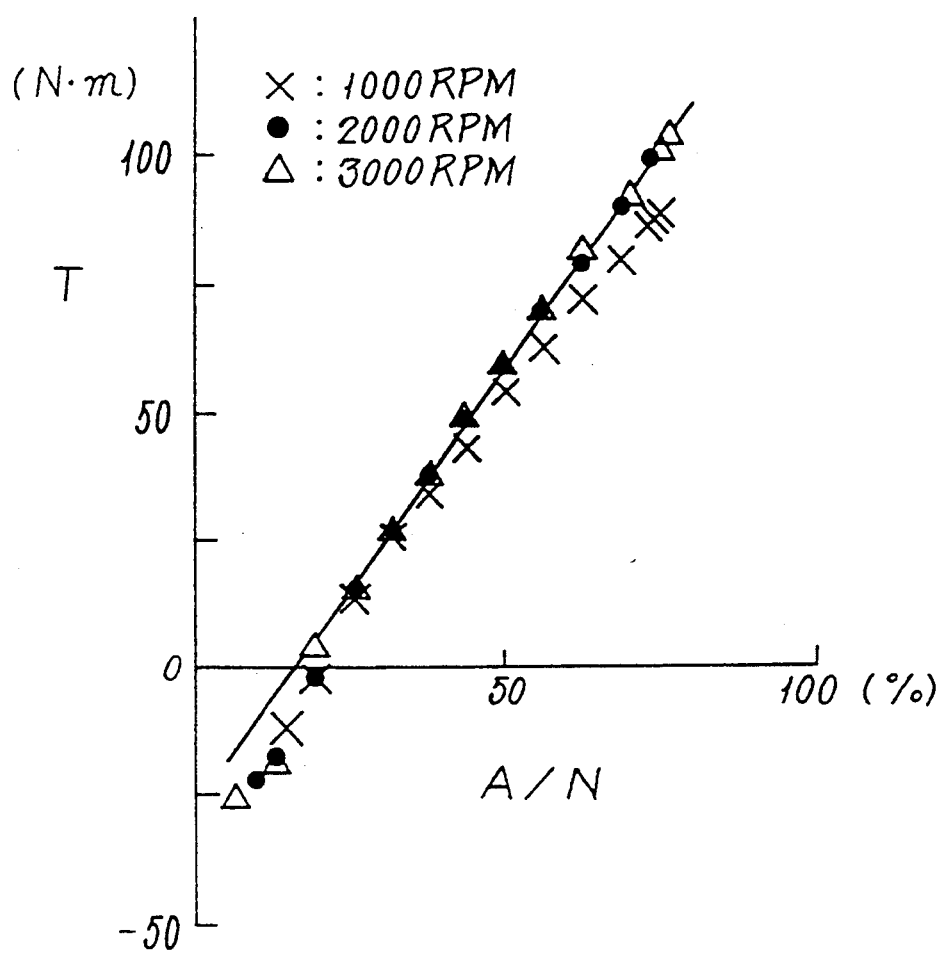
FIG. 6 is a characteristic curve of an intake air flow/torque calculating map for use in the output control carried out by the device illustrated in FIG. 1.
Figure 13:
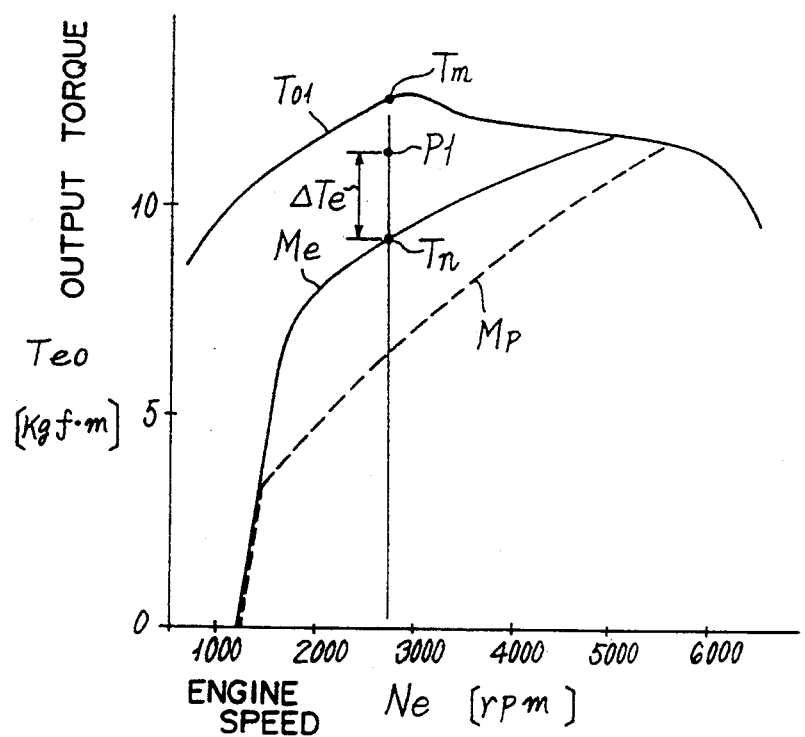
FIG. 13 is a characteristic curve of a torque calculating map for use in the ECU in the device illustrated in FIG. 1.

Then, at step n9, a maximum available torque Tm (maximum value) for the current engine speed Ne is calculated by using the map illustrated in FIG. 13. In addition, an actual engine torque Tn corresponding to the detected engine speed Ne is calculated (according to the map illustrated in FIG. 6). When a value obtained by adding the transmission auxiliary torque $\Delta Te$ to the actual engine torque Tn is smaller than the maximum available torque Tm (which is exemplified at a point p1 in FIG. 13), step n11 is carried out. Otherwise, step n12 is carried out. Then step n12 makes the objective engine torque Te be equal to a maximum torque Tmax (that is, the maximum available torque Tm corresponding to the current engine speed Ne). In addition, the step n11 determines the objective engine torque Te by simply adding $\Delta Te$ to the corrected required torque Teo1. Then step n13 is carried out wherein the throttle opening $\theta s$ is determined in accordance with the objective engine torque Te and the engine speed Ne by using the maps as illustrated in FIGS. 6 and 7. The subsequent step n14 calculates a deviation $\Delta\theta$ between the throttle opening $\theta s$ and the actual throttle opening $\theta n$ to calculate output Phn with which the deviation $\Delta\theta$ can be eliminated. The throttle valve 9 is actuated by supplying the output Phn to the pulse motor 11 so that the engine generates the objective engine torque Te.

Figure 39:
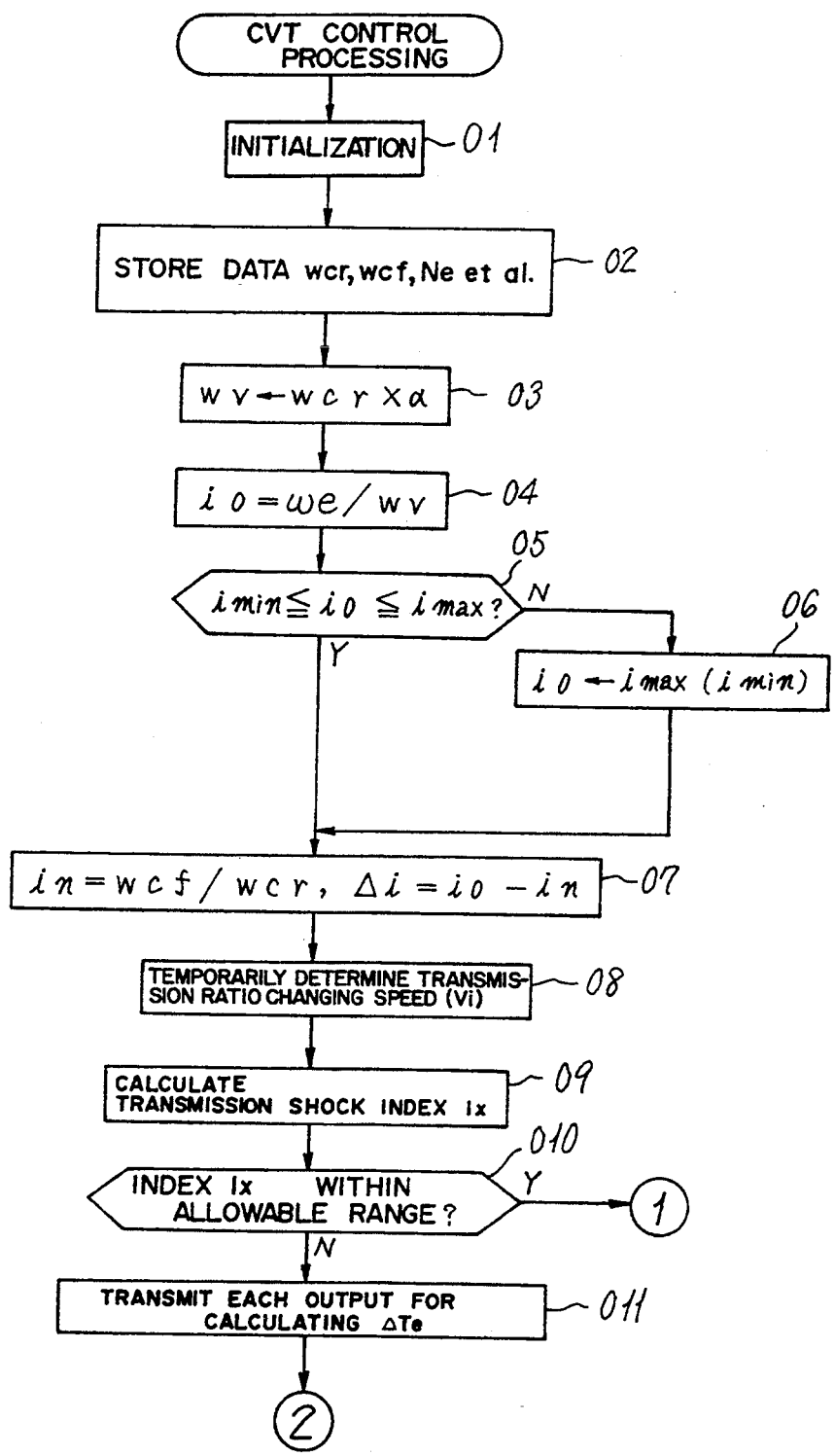
FIG. 39 is a flow chart of a CVT control processing routine for use in the device illustrated in FIG. 35.
Figure 40:
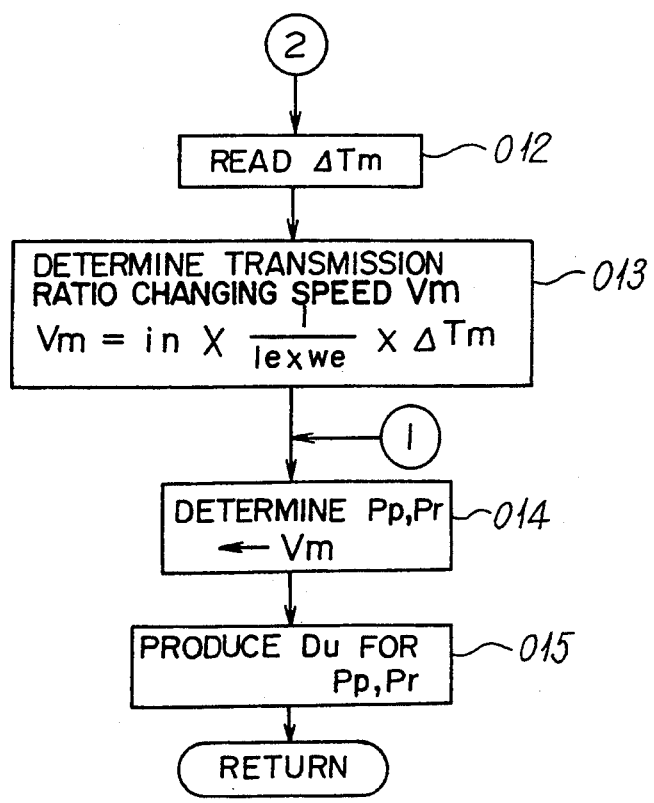
FIG. 40 is a flow chart of a CVT control processing routine continued from that illustrated in FIG. 39.

On the other hand, the CVTECU 21 carries out the CVT control illustrated in FIG. 39. Steps o1 and o2 carry out initialization operation to determine whether or not an error is detected in each circuit. Then, data such as the rotation speed wcf and wcr of the primary pulley 26 and the secondary pulley 28, respectively, and the engine engine speed $\omega e$ (=Ne(current engine speed)$\times 2\pi r$) supplied from the DBWECU 3 or the like are read and stored in a predetermined area.

Step o3 multiplies the speed information wcr of the secondary pulley by a constant $\alpha$ to obtain the vehicle speed wv. Steps 04 and 05 calculate the objective transmission ratio io in accordance with the actual engine rotation speed Ne ($\omega e/2\pi r$) and the vehicle speed wv. Subsequently, judgment is made regarding whether or not the objective transmission ratio io is within the allowable range. If io is within the allowable range, step 08 is carried out. Otherwise, the control passes to step o6 where the objective transmission ratio io is restricted within the realizable range between the maximum and minimum values imax(imin). Then, step 07 is carried out.

The step o7 calculates the actual transmission ratio in (=wcf/wcr) of the continuously variable transmission according to the speeds wcf and wcr of the primary pulley 26 and the secondary pulley 28, respectively, to calculate the transmission ratio deviation $\Delta i$ between the objective transmission ratio io and the actual transmission ratio in. The step o7 calculates the transmission ratio changing speed vi for the transmission ratio deviation $\Delta i$ by means of the transmission ratio changing speed vi calculating map illustrated in FIG. 14.

Then, step o9 calculates a transmission shock index lx (=vix$\omega e$). The transmission ratio changing speed vi and the engine rotation speed $\omega e$ constituting this transmission shock index lx adversely affect the rotational angular acceleration d$\omega e$/dt of the engine shaft when the inertial force of the continuously variable transmission 35 is taken into consideration. Thus, the rotational fluctuation level is considered to be neglible when the transmission shock index lx is within a predetermined range.

Step o10 judges whether or not the transmission shock index 1x is within the allowable range lxmin$\leq$lxmax. This allowable range is set on the basis of shock level data on transmission obtained by emperically. When 1x is with the allowable range, control advances to step o14; otherwise, control goes to step o11.

At steps o11 and o12, signals such as the latest 1v and vi are transmitted to the DBWECU 3 to calculate the transmission auxiliary torque $\Delta Te(=(1/i)x(di/dt)x$Iex$\omega e$) described with respect to step n8. Then, at step n12, the DBWECU 3 reads the transmission ratio changing speed subtracted torque $\Delta Tm$, which is the undertorque caused by setting the objective torque Te as the maximum torque Temax. Further, the control passes to step o13.

The transmission ratio changing speed Vm=di/dt=ix(1/(Iex$\omega e$))x$\Delta Tm$ is calculated according to the above mentioned equation (7).

At step o14, duty ratios Dup and Dur are determined based on the transmission ratio changing speed Vm, so as to keep the primary and line pressures Pp and Pro The first and the second solenoid valves 33 and 34 are controlled with respect to the determined duty ratios Dup and Dur, respectively. Thus, the actual transmission ratio in of the continuously variable transmission 35 approaches to the objective transmission ratio io.

In this embodiment, the required power Po is determined according to the throttle opening and the objective torque. The engine speed and the objective torque is determined according to the required output Po.

Accordingly, the requirement of the driver is reflected at this time. In addition, the transmission auxiliary torque ΔTe is corrected when the transmission shock index 1x exceeds the allowable range. The objective engine torque is corrected by means of the transmission auxiliary torque ΔTe. Further, the objective engine torque Teo is restricted within the allowable range to prevent excess increase of the output. Further, the transmission ratio changing speed Vm can be corrected with the transmission ratio changing speed subtracted torque ΔTm corresponding to the undertorque caused when the objective engine undertorque Teo is restricted within the allowable range. Thus, sudden transmission operation, which may cause underpower, can be avoided. Furthermore, it is possible to eliminate slip of the steel belt 27 and shock caused by excessive output. This results in improvement of the driving feeling.

Industrial Applicability

As described so far, the control device according to the present invention enables the continuously variable transmission to perform its transmission operation at an adequate transmission ratio changing speed and controls the internal combustion engine with the output suitable therefor. Accordingly, it is possible to reduce slip and transmission shocks caused by the transmission operation. Thus, the control device is effectively applied to a power transmission system of a vehicle of which drivability is an important factor.

We claim:

1. A control device for controlling an internal combustion engine and a continuously variable transmission, the continuously variable transmission transmitting power between the internal combustion engine and driving wheels, and having a continuously changeable transmission ratio, said control device comprising:

driving condition detecting means for detecting driving conditions of said vehicle;

objective transmission ratio setting means for setting an objective transmission ratio for said continuously variable transmission according to the driving condition detected by the driving condition detecting means;

transmission ratio detecting means for detecting an actual transmission ratio of said continuously variable transmission;

transmission ratio deviation calculating means for calculating a deviation between the objective transmission ratio set by said objective transmission ratio setting means and the actual transmission ratio detected by said transmission ratio detecting means;

transmission ratio changing speed setting means for setting a transmission ratio changing speed which is a changing rate of the transmission ratio according to the transmission ratio deviation calculated by said transmission ratio deviation calculating means;

transmission controlling means for controlling said continuously variable transmission to obtain the transmission ratio changing speed set by said transmission ratio changing speed setting means;

transmission auxiliary torque calculating means for calculating a transmission auxiliary torque which is consumed during a transmission operation of said continuously variable transmission based on the transmission changing ratio speed set by said transmission ratio changing speed setting means; and internal combustion engine controlling means for controlling output of the internal combustion engine according to the transmission auxiliary torque calculated by the transmission auxiliary torque calculating means.

2. A control device as claimed in claim 1, wherein said internal combustion engine comprises, in its suction system, intake air flow adjusting means, which is controllable independent of the operation of a driver-operable member, for adjusting an amount of air delivered by said suction system to said engine, and wherein said driving condition detecting means comprises acceleration requirement detecting means for detecting an operational amount of said driver-operable member as acceleration requirement information of a driver, said objective transmission ratio setting means sets said objective transmission ratio according to the operational amount of said driver-operable member detected by said acceleration requirement detecting means, said internal combustion engine controlling means comprises, required torque setting means for setting required torque, according to the operational amount of said driver-operable member detected by said acceleration requirement detecting means, as torque which is necessary for acceleration required by said driver;

objective engine torque setting means for setting objective engine torque according to the required torque set by said required torque setting means and the transmission auxiliary torque calculated by said transmission auxiliary torque calculating means; and engine torque controlling means for controlling said intake air flow adjusting means so as to obtain the objective engine torque set by said objective engine torque setting means.

3. A control device as claimed in claim 2, wherein said objective engine torque setting means divides torque obtained by adding the required torque set by said required torque setting means to the transmission auxiliary torque calculated by said transmission auxiliary torque calculating means into first torque, which the engine can actually output, and second torque, which is torque other than said first torque, and sets said first torque as the objective engine torque.

4. A control device as claimed in claim 3, wherein said transmission ratio changing speed setting means further comprises transmission ratio changing speed correcting means for correcting the transmission ratio changing speed set by said transmission ratio changing speed setting means according to said second torque.

5. A control device as claimed in claim 2, wherein said driver-operable member is an accelerator pedal, and said intake air flow adjusting means is a throttle valve.

6. A control device as claimed in claim 1, wherein said internal combustion engine comprises, in its suction system, intake air flow adjusting means, which is controllable independent of the operation of a driver-operable member, for adjusting an amount of air delivered by said suction system to said engine, said internal combustion engine controlling means comprises:

auxiliary intake air flow setting means for calculating auxiliary intake air flow which is necessary for obtaining said transmission auxiliary torque according to the transmission auxiliary torque calculated by said transmission auxiliary torque calculating means; and auxiliary intake air flow controlling means for controlling said intake air flow adjusting means so as to obtain the auxiliary intake air flow set by said auxiliary intake air flow setting means.

7. A control device as claimed in claim 6, wherein said transmission ratio changing speed setting means further comprises transmission ratio changing speed correcting means for correcting said transmission ratio changing speed according to the auxiliary intake air flow set by said auxiliary intake air flow setting means.

8. A control device as claimed in claim 7, wherein said transmission ratio changing speed correcting means corrects said transmission ratio changing speed when the auxiliary intake air flow set by said auxiliary intake air flow setting means is larger than a predetermined value.

9. A control device as claimed in claim 7, wherein said transmission ratio changing speed correcting means corrects said transmission ratio changing speed only when it judges that the auxiliary intake air flow set by said auxiliary intake air flow setting means is larger than a first predetermined value and is smaller than a second predetermined value, which is larger than said first predetermined value, and corrects said transmission ratio changing speed when said auxiliary intake air flow is larger than said second predetermined value.

10. A control device as claimed in claim 6, wherein said intake air flow adjusting means is an idling speed controlling valve for opening and closing a bypass formed by means of bypassing a throttle valve of said engine.

11. A control device as claimed in claim 1, wherein said internal combustion engine further comprises:

intake air flow adjusting means, which is disposed in a suction system and is actuated by operating a driver-operable member;

fuel supply means for adjusting a fuel supply amount for said internal combustion engine;

igniting means for igniting said internal combustion engine, and wherein said driving condition detecting means comprises acceleration requirement detecting means for detecting an operational amount of said driver-operable member as acceleration requirement information of said driver, said objective transmission ratio setting means sets said objective transmission ratio according to the operational amount of said driver-operable member detected by said acceleration requirement means, and said internal combustion engine controlling means comprises first engine torque controlling means for setting an objective air fuel ratio and an objective spark timing according to the transmission auxiliary torque calculated by said auxiliary torque calculating means, controls said fuel supply means according to said objective air fuel ratio, and controls said igniting means according to said objective spark timing.

12. A control device as claimed in claim 11, wherein said fuel supply means cuts off fuel supply to one or more cylinder(s) of a plurality of cylinders, thereby to rest said one or more cylinder(s), and said first engine torque controlling means sets the objective air fuel ratio richer than the current air fuel ratio when the transmission auxiliary torque calculated by said transmission auxiliary toque calculating means is larger than zero, and sets the number of cylinders to rest and the objective spark timing according to said transmission auxiliary torque when said transmission auxiliary torque is equal to or smaller than zero.

13. A control device as claimed in claim 12, wherein said first engine torque controlling means sets the objective air fuel ratio richer than the current air fuel ratio only when (1) an air fuel ratio which is richer than the current air fuel ratio can be obtained and (2) the transmission auxiliary torque calculated by said transmission auxiliary torque calculating means is larger than zero.

14. A control device as claimed in claim 11, wherein said internal combustion engine controlling means further comprises:

required torque setting means for setting required torque, according to the operational amount of said driver-operable member detected by said acceleration requirement detecting means, as torque which is necessary for acceleration required by said driver;

objective engine torque setting means for setting objective engine torque according to the required torque set by said required torque setting means and the transmission auxiliary torque calculated by said transmission auxiliary torque calculating means; and second engine torque controlling means for controlling said intake air flow adjusting means so as to obtain the objective engine torque set by said objective engine torque setting means.

15. A control device as claimed in claim 14, wherein said first engine torque controlling means sets the objective air fuel ratio richer than the current air fuel ratio when the transmission auxiliary torque calculated by said transmission auxiliary torque calculating means is larger than zero, determines the difference between power torque of the engine, which is estimated from the current intake air flow, and the objective engine torque calculated by said objective engine torque calculating means as a required torque reduction amount, and determines both the number of cylinders to rest and the objective spark timing, which is a spark retard amount, of said internal combustion engine according to said required torque reduction amount when said transmission auxiliary torque is equal to or smaller than zero.

16. A control device as claimed in claim 15, wherein said first engine torque controlling means sets the objective spark timing according to a deviation between said required torque reduction amount and torque reduced by resting cylinder(s).

17. A control device as claimed in claim 16, wherein said first engine torque controlling means restricts said objective spark timing within a predetermined allowable range.

18. A control device as claimed in claim 17, wherein said transmission ratio changing speed setting means comprises transmission ratio changing speed correcting means for correcting said transmission ratio changing speed according to a spark retard amount which is lacking by restricting said objective spark timing within the predetermined allowable range by said first engine torque controlling means.

19. A control device as claimed in claim 11, wherein said driver-operable member is an accelerator pedal, and said intake air flow adjusting means is a throttle valve.

20. A control device as claimed in claim 1, wherein said internal combustion engine comprises, in its suction system, intake air flow adjusting means, which is controllable independent of the operation of a driver-operable member, for adjusting an amount of air delivered by said suction system to said engine, and wherein said driving condition detecting means comprises operational amount detecting means for detecting an operational amount of said driver-operable member, said internal combustion engine controlling means comprises, required output detecting means for obtaining required output information of said driver according to the operational amount of said driver-operable member detected by said operational amount detecting means;

required torque setting means for setting required torque corresponding to the required output information of said driver and for setting an objective engine speed according to the required output information obtained by said required output detecting means;

objective engine torque calculating means for setting an objective engine torque according to the required torque set by said required torque setting means and the transmission auxiliary torque calculated by said transmission auxiliary torque calculating means; and engine torque controlling means for controlling said intake air flow adjusting means so as to obtain the objective engine torque set by said objective engine torque setting means, said objective transmission ratio setting means sets said objective transmission ratio according to the objective engine speed set by said required torque setting means.

21. A control device as claimed in claim 20, wherein said objective transmission ratio setting means restricts said objective transmission ratio within an allowable range when judging the objective transmission ratio set in accordance with said objective engine speed is not in said allowable range.

22. A control device as claimed in claim 21, wherein said objective transmission ratio setting means sets a modified engine speed corresponding to the objective transmission ratio when restricting said objective transmission ratio within said allowable range, and said required torque setting means sets a modified required torque as said required torque according to the required output information obtained by said required output detecting means and the modified engine speed set by said objective transmission ratio setting means.

23. A control device as claimed in claim 21, wherein said objective engine torque calculating means restricts said objective engine torque within said allowable torque range when the objective engine torque obtained according to the required torque set by said required torque setting means and the transmission auxiliary torque calculated by said transmission auxiliary torque calculating means is not in a predetermined allowable torque range; and said transmission ratio changing speed setting means comprises, transmission ratio changing speed temporarily setting means for setting a temporal transmission ratio changing speed according to the transmission ratio deviation calculated by said transmission ratio deviation calculating means, and transmission ratio changing speed correcting means for correcting said transmission ratio changing speed based on a subtracted torque, which is an amount of torque lacking when said objective engine torque is restricted within said predetermined allowable torque range by said objective engine torque calculating means, and said temporal transmission ratio changing speed set by said transmission ratio changing speed temporarily setting means.

24. A control device as claimed in claim 23, wherein said transmission ratio changing speed correcting means calculates, according to said temporal transmission ratio changing speed, a transmission shock index which represents degree of transmission shock, and determines the transmission ratio changing speed by correcting said temporal transmission ratio changing speed according to said subtracted torque when said transmission shock index is not in a predetermined allowable range, and determines said temporal transmission ratio changing speed as the transmission ratio changing speed when said transmission shock index is in said predetermined allowable range.

25. A control device as claimed in claim 20, wherein said driver-operable member is an accelerator pedal, and said intake air flow adjusting means is a throttle valve.

26. A control device as claimed in claim 1, wherein said internal combustion engine controlling means comprises:

required torque setting means for setting a required torque based on said detected driving conditions;

objective engine torque setting means for setting an objective engine torque based on said required torque and said transmission auxiliary torque; and engine torque controlling means for controlling engine output according to said objective engine torque.

27. A control device as claimed in claim 26, wherein said driving condition detecting means includes acceleration requirement detecting means for detecting, as an acceleration requirement, an operational amount of a driver operable member;

said required torque setting means sets said required torque based on said acceleration requirement; and said objective engine torque setting means includes adding means for adding said required torque to said transmission auxiliary torque to obtain an intermediate objective engine torque, and setting means for setting said objective engine torque based on said intermediate objective engine torque and for setting an undertorque based on said intermediate objective engine torque.

28. A control device as claimed in claim 27, wherein said transmission ratio changing speed calculating means comprises:

intermediate transmission ratio changing speed determining means for determining an intermediate transmission ratio changing speed from said objective transmission ratio;

subtraction value calculating means for calculating a transmission ratio changing speed subtraction value based on said undertorque; and a subtractor for subtracting said transmission ratio changing speed subtraction value from said intermediate transmission ratio changing speed to produce said transmission ratio changing speed.

29. A control device as claimed in claim 28, wherein said required torque setting means reads said required torque from a first data map based on said acceleration requirement, and said intermediate transmission ratio changing speed determining means reads said intermediate transmission ratio changing speed from a second data map based on said objective transmission ratio.

30. A control device as claimed in claim 26, wherein said internal combustion engine controlling means further comprises:
   transmission auxiliary torque comparison means for determining whether said transmission auxiliary torque is greater than zero;
   air fuel determining means for determining whether an air fuel ratio of said engine can be increased when said transmission auxiliary torque comparison means determines that said transmission auxiliary torque is greater than zero; and
   fuel injector controlling means for controlling a fuel injection valve to increase said air fuel ratio when said air fuel determining means determines that said air fuel ratio of said engine can be increased.

31. A control device as claimed in claim 30, wherein said driving condition detecting means includes intake air flow detecting means for detecting an intake air flow amount of said engine; and
   said air fuel determining means determines an increase torque amount based on said intake air flow amount, and determines that said air fuel ratio of said engine can be increased when said increase torque amount is greater than said transmission auxiliary torque.

32. A control device as claimed in claim 26, wherein said internal combustion engine controlling means further comprises:
   transmission auxiliary torque comparison means for determining whether said transmission auxiliary torque is greater than zero;
   fuel cut setting means for setting a fuel cut number when said transmission auxiliary torque comparison means determines that said transmission auxiliary torque is not greater than zero; and
   fuel control means for controlling fuel injectors of said engine to cut the supply of fuel to a number of cylinders in said engine equal to said fuel cut number.

33. A control device as claimed in claim 32, wherein said driving condition detecting means includes intake air flow detecting means for detecting an intake air flow amount of said engine; and
   said fuel cut setting means calculates an expected torque based on said intake air flow amount, and determines said fuel cut number based on said expected torque and said objective engine torque.

34. A method as claimed in claim 32, wherein said internal combustion engine controlling means further comprises:
   spark retardation setting means for setting a spark retardation amount based on said fuel cut number when said transmission auxiliary comparison means determines that said transmission auxiliary torque is not greater than zero; and
   ignition control means for controlling ignition of said engine according to said spark retardation amount.

35. A control device as claimed in claim 26, wherein said internal combustion engine controlling means further comprises:
   transmission auxiliary torque comparison means for determining whether said transmission auxiliary torque is greater than zero;
   spark retardation setting means for setting a spark retardation amount when said transmission auxiliary comparison means determines that said transmission auxiliary torque is not greater than zero; and
   ignition control means for controlling ignition of said engine according to said spark retardation amount.

36. A method as claimed in claim 35, wherein said transmission ratio changing speed setting means comprises:
   first means for calculating an intermediate transmission ratio changing speed based on said objective transmission ratio; and
   correcting means for correcting said intermediate transmission ratio changing speed to produce said transmission ratio changing speed based on said spark retardation amount.

37. A control device as claimed in claim 26, wherein said internal combustion engine controlling means includes required output calculating means for calculating a required output corresponding to said detected driving conditions;
   said required torque setting means sets said required torque based on said required output; and
   said internal combustion engine controlling means further includes correcting means for correcting said required output based on said objective transmission ratio changing speed, 38. A control device as claimed in claim 37, wherein said driving condition detecting means includes actuation detecting means for detecting an operation amount of a driver operable member; and
   said required output calculating means calculates said required output based on said detected operation amount.

39. A control device as claimed in claim 26, wherein said required torque calculating means comprises:
   maximum torque determining means for determining a maximum spare torque based on said detected driving conditions;
   actual torque calculating means for calculating an actual torque based on said detected driving conditions;
   comparison torque calculating means for calculating a comparison torque based on said actual torque and said transmission auxiliary torque;
   determining means for determining whether said comparison torque is smaller than said maximum spare torque;
   objective engine torque calculating means for calculating said objective engine torque from said required torque and said transmission auxiliary torque when said determining means determines that said comparison torque is smaller than said maximum spare torque, and for determining said objective engine torque as said maximum spare torque when said determining means determines that said comparison torque is not smaller than said maximum spare torque.

40. A control device as claimed in claim 26, wherein said driving condition detecting means includes a water temperature sensor for detecting a temperature of water used by said engine; and said internal combustion engine controlling means includes torque correcting means for correcting said objective engine torque based on a detected water temperature to produce said objective engine torque.

41. A control device as claimed in claim 1, wherein said internal combustion engine control means comprises:

auxiliary intake air flow means for setting an auxiliary intake air flow based on said transmission auxiliary torque; and auxiliary intake air flow control means for controlling an intake air flow means, which adjusts an amount of air flow no the engine, based on said auxiliary intake airflow.

42. A control device as claimed in claim 41, wherein said transmission ratio changing speed setting means comprises:

intermediate transmission ratio changing speed determining means for determining an intermediate transmission ratio changing speed based on said objective transmission ratio; and transmission ratio changing speed correcting means for calculating a transmission ratio changing speed correction amount when said auxiliary intake air flow is greater than a first threshold, for correcting said intermediate transmission ratio changing speed based on said transmission ratio changing speed correction amount to determine said transmission ratio changing speed when said transmission ratio changing speed correction amount is calculated, and for determining said transmission ratio changing speed as said intermediate transmission ratio changing speed when said transmission ratio changing speed correction amount is not calculated.

43. A control device as claimed in claim 41, wherein said transmission ratio changing speed setting means comprises:

intermediate transmission ratio changing speed determining means for determining an intermediate transmission ratio changing speed based on said objective transmission ratio; and transmission ratio changing speed correcting means for calculating an estimated value of suction pipe negative pressure for a suction pipe of said engine when said auxiliary intake air flow is less than a first threshold and greater than a second threshold, for calculating said transmission ratio changing speed correction amount when said estimated value is greater than a predetermined estimated threshold, for correcting said intermediate transmission ratio changing speed based on said transmission ratio changing speed correction amount to determine said transmission ratio changing speed when said transmission ratio changing speed correction amount is calculated, and for determining said transmission ratio changing speed as said intermediate transmission ratio changing speed when said transmission ratio changing speed correction amount is not calculated.

44. A control device as claimed in claim 41, wherein said transmission ratio changing speed setting means comprises:

intermediate transmission ratio changing speed determining means for determining an intermediate transmission ratio changing speed based on said objective transmission ratio; and transmission ratio changing speed correcting means for calculating a transmission ratio changing speed correction amount when said auxiliary intake air flow is greater than a first threshold, for calculating an estimated value of suction pipe negative pressure for a suction pipe of said engine when said auxiliary intake air flow is less than said first threshold and greater than a second threshold, for calculating said transmission ratio changing speed correction amount when said estimated value is greater than a predetermined estimated threshold, for correcting said intermediate transmission ratio changing speed based on said transmission ratio changing speed correction amount to determine said transmission ratio changing speed when said transmission ratio changing speed correction amount is calculated, and for determining said transmission ratio changing speed as said intermediate transmission ratio changing speed when said transmission ratio changing speed correction amount is not calculated.

45. A control device as claimed in claim 1, wherein said transmission ratio changing speed setting means comprises:

temporal transmission determining means for determining a temporal transmission ratio changing speed based on said objective transmission ratio;

transmission shock calculating means for calculating a transmission shock index, representing a degree of transmission shock, from said temporal transmission ratio changing speed;

first determining means for determining if said transmission shock index is within an allowable range;

transmission ratio changing speed calculating means for calculating said transmission ratio changing speed based on said actual transmission ratio when said first determining means determines that said transmission shock index is not within said allowable range, and for determining said transmission ratio changing speed as said temporal transmission ratio changing speed when said first determining means determines that said transmission shock index is within said allowable range.

46. A control device as claimed in claim 45, wherein said maximum torque determining means for determining a maximum spare torque based on said detected driving conditions;

actual torque calculating means for calculating an actual torque based on said detected driving conditions;

comparison torque calculating means for calculating a comparison torque based on said actual torque and said transmission auxiliary torque;

second determining means for determining whether said comparison torque is smaller than said maximum spare torque;

objective engine torque calculating means for calculating said objective engine torque from said required torque and said transmission auxiliary torque when said second determining means determines that said comparison torque is smaller than said maximum spare torque, and for determining said objective engine torque as said maximum spare torque when said second determining means determines that said comparison torque is not smaller than said maximum spare torque; and undertorque calculating means for calculating an undertorque when said determining means determines that said comparison torque is not smaller than said maximum spare torque.

47. A control device as claimed in claim 46, wherein said transmission ratio changing speed calculating means calculates said transmission ratio changing speed based on said actual transmission ratio changing speed and said undertorque when said determining means determines that said transmission shock index is not within said allowable range.

48. A method for controlling an internal combustion engine and a continuously variable transmission, the continuously variable transmission transmitting output from said internal combustion engine to driving wheels, and having a continuously changeable transmission ratio, said method comprising the steps of:
(a) detecting driving conditions of said vehicle;
(b) setting an objective transmission ratio for said continuously variable transmission according to said detected driving condition;
(c) detecting an actual transmission ratio of said continuously variable transmission;
(d) calculating a deviation between said objective transmission ratio and said actual transmission ratio;
(e) setting a transmission ratio changing speed according to said transmission ratio deviation;
(f) controlling said continuously variable transmission to obtain said transmission ratio changing speed;
(g) calculating a transmission auxiliary torque which is consumed during a transmission operation of said continuously variable transmission based on said transmission ratio changing speed; and
(h) controlling output of said engine according to said transmission auxiliary torque.

49. A method as claimed in claim 48, wherein said step (h) comprises the steps of:
(h1) setting a required torque based on said detected driving conditions;
(h2) setting an objective engine torque based on said required torque and said transmission auxiliary torque; and
(h3) controlling engine output according to said objective engine torque.

50. A method as claimed in claim 49, wherein
said step (a) includes the step of (a1) detecting, as an acceleration requirement, an operational amount of a driver operable member;
said step (h1) sets said required torque based on said acceleration requirement; and
said step (h2) includes the steps of (h21) adding said required torque to said transmission auxiliary torque to obtain an intermediate objective engine torque, (h22) setting said objective engine torque based on said intermediate objective engine torque, and (h23) setting an undertorque based on said intermediate objective engine torque.

51. A method as claimed in claim 50, wherein said step (e) comprises the steps of:
(e1) determining an intermediate transmission ratio changing speed from said objective transmission ratio;
(e2) calculating a transmission ratio changing speed subtraction value based on said undertorque; and
(e3) subtracting said transmission ratio changing speed subtraction value from said intermediate transmission ratio changing speed to produce said transmission ratio changing speed.

52. A method as claimed in claim 51, wherein said step (h1) includes the step of (h11) reading said required torque from a first data map based on said acceleration requirement, and said step (e1) includes the step of (e11) reading said intermediate transmission ratio changing speed from a second data map based on said objective transmission ratio.

53. A method as claimed in claim 48, wherein said step (h) comprises the steps of:
(h1) setting an auxiliary intake air flow based on said transmission auxiliary torque; and
(h2) controlling an intake air flow means, which adjusts an amount of air flow to the engine, based on said auxiliary intake airflow.

54. A method as claimed in claim 53, wherein step (e) comprises the steps of:
(e1) determining an intermediate transmission ratio changing speed based on said objective transmission ratio;
(e2) calculating a transmission ratio changing speed correction amount when said auxiliary intake air flow is greater than a first threshold;
(e3) correcting said intermediate transmission ratio changing speed based on said transmission ratio changing speed correction amount to determine said transmission ratio changing speed when said transmission ratio changing speed correction amount ms calculated; and
(e4) determining said transmission ratio changing speed as said intermediate transmission ratio changing speed when said transmission ratio changing speed correction amount is not calculated.

55. A method as claimed in claim 53, wherein said stem (e) comprises the steps of:
(e1) determining an intermediate transmission ratio changing speed based on said objective transmission ratio;
(e2) calculating an estimated value of suction pipe negative pressure for a suction pipe of said engine when said auxiliary intake air flow is less than a first threshold and greater than a second threshold, said first threshold being greater than said second threshold;
(e3) calculating a transmission ratio changing speed correction amount when said estimated value is greater than a predetermined estimated threshold;
(e4) correcting said intermediate transmission ratio changing speed based on said transmission ratio changing speed correction amount to determine said transmission ratio changing speed when said transmission ratio changing speed correction amount is calculated; and
(e5) determining said transmission ratio changing speed as said intermediate transmission ratio changing speed when said transmission ratio changing speed correction amount is not calculated.

56. A method as claimed in claim 53, wherein said step (e) comprises the steps of:
(e1) determining an intermediate transmission ratio changing speed based on said objective transmission ratio;
(e2) calculating a transmission ratio changing speed correction amount when said auxiliary intake air flow is greater than a first threshold;

(e3) calculating an estimated value of suction pipe negative pressure for a suction pipe of said engine when said auxiliary intake air flow is less than said first threshold and greater than a second threshold, said first threshold being greater than said second threshold;

(e4) calculating said transmission ratio changing speed correction amount when said estimated value is greater than a predetermined estimated threshold;

(e5) correcting said intermediate transmission ratio changing speed based on said transmission ratio changing speed correction amount to determine said transmission ratio changing speed when said transmission ratio changing speed correction amount is calculated; and (e6) determining said transmission ratio changing speed as said intermediate transmission ratio changing speed when said transmission ratio changing speed correction amount is not calculated.

57. A method as claimed in claim 49, wherein said stem (h) further comprises the steps of:

(h4) determining whether said transmission auxiliary torque is greater than zero;

(h5) determining whether an air fuel ratio of said engine can be increased when said step (h4) determines that said transmission auxiliary torque is greater than zero; and (h6) controlling a fuel injection valve to increase said air fuel ratio when said step (h8) determines that said air fuel ratio of said engine can be increased.

58. A method as claimed in claim 49, wherein said step (h) further comprises the steps of:

(h4) determining whether said transmission auxiliary torque is greater than zero;

(h5) setting a fuel cut number when said step (h4) determines that said transmission auxiliary torque is not greater than zero; and (h6) controlling fuel injectors of said engine to cut the supply of fuel to a number of cylinders in said engine equal to said fuel cut number.

59. A method as claimed in claim 49, wherein said step (h) further comprises the steps of:

(h4) determining whether said transmission auxiliary torque is greater than zero;

(h5) setting a spark retardation amount when said step (h4) determines that said transmission auxiliary torque is not greater than zero; and (h6) controlling ignition of said engine according to said spark retardation amount.

60. A method as claimed in claim 57, wherein said step (a) includes the step of (a1) detecting an intake air flow amount of said engine; and said step (h5) includes the steps of, (h52) determining an increase torque amount based on said intake air flow amount; and (h53) determining that said air fuel ratio of said engine can be increased when said increase torque amount is greater than said transmission auxiliary torque.

61. A method as claimed in claim 58, wherein said step (a) includes the step of (a1) detecting an intake air flow amount of said engine; and said step (h5) includes the steps of, (h52) calculating an expected torque based on said intake air flow amount; and (h53) determining said fuel cut number based on said expected torque and said objective engine torque.

62. A method as claimed in claim 58, wherein said step (h) further comprises the steps of:

(h7) setting a spark retardation amount based on said fuel cut number when said step (h4) determines that said transmission auxiliary torque is not greater than zero; and (h8) controlling ignition of said engine according to said spark retardation amount.

63. A method as claimed in claim 59, wherein said step (e) comprises the steps of:

(e1) calculating an intermediate transmission ratio changing speed based on said objective transmission ratio; and (e2) correcting said intermediate transmission ratio changing speed to produce said transmission ratio changing speed based on said spark retardation amount.

64. A method as claimed in claim 49, herein said step (h) includes the step of (h4) calculating a required output corresponding to said detected driving conditions;

said step (h1) calculates said required torque based on said required output; and said step (h) further includes the step of (h5) correcting said required output based on said objective transmission ratio changing speed.

65. A method as claimed in claim 64, wherein said step (a) includes the step of (a1) detecting an operational amount of a driver operable member; and said step (h4) calculates said required output based on said detected operational amount.

66. A method as claimed in claim 49, wherein said step (h2) comprises the steps of:

(h21) determining a maximum spare torque, based on said detected driving conditions;

(h22) calculating an actual torque based on said detected driving conditions;

(h23) calculating a comparison torque based on said actual torque and said transmission auxiliary torque;

(h24) determining whether said comparison torque is smaller than said maximum spare torque;

(h25) calculating said objective engine torque from said required torque and said transmission auxiliary torque when said step (h24) determines that said comparison torque is smaller than said maximum spare torque; and (h26) determining said objective engine torque as said maximum spare torque when said step (h24) determines that said comparison torque is not smaller than said maximum spare torque.

67. A method as claimed in claim 48, wherein said step (e) comprises the steps of:

(e1) determining a temporal transmission ratio changing speed based on said objective transmission ratio;

(e2) calculating a transmission shock index from said temporal transmission ratio changing speed;

(e3) determining if said transmission shock index is within an allowable range;

(e4) calculating said transmission ratio changing speed based on said actual transmission ratio when said step (e3) determines that said transmission shock index is not within said allowable range; and (e5) determining said transmission ratio changing speed as said temporal transmission ratio changing speed when said step (e3) determines that said transmission shock index is within said allowable range.

68. A method as claimed in claim 67, wherein said step (h2) comprises the steps of:
(h21) determining a maximum spare torque;
(h22) calculating an actual torque;
(h23) calculating a comparison torque based on said actual torque and said transmission auxiliary torque;
(h24) determining whether said comparison torque is smaller than said maximum spare torque;
(h25) calculating said objective engine torque from said required engine torque and said transmission auxiliary torque when said step (h24) determines that said comparison torque is smaller than said maximum spare torque;
(h26) determining said objective engine torque as said maximum spare torque when said step (h24) determines that said comparison torque is not smaller than said maximum spare torque; and
(h26) determining an undertorque when said step (h24) determines that said comparison torque is not smaller than said maximum spare torque.

69. A method as claimed in claim 68, wherein said step (e4) calculates said transmission ratio changing speed based on said actual transmission ratio changing speed ratio and said undertorque when said step (e3) determines that said transmission shock index is not within said allowable range.

* * * * *